US009372581B2

(12) United States Patent
Cattivelli et al.

(10) Patent No.: US 9,372,581 B2
(45) Date of Patent: Jun. 21, 2016

(54) INTERFERENCE ESTIMATION AND ADAPTIVE RECONFIGURATION OF A CAPACITIVE TOUCH CONTROLLER

(75) Inventors: Federico Santiago Cattivelli, Newport Beach, CA (US); David Amory Sobel, Los Altos, CA (US); John S. Walley, Ladera Ranch, CA (US); Satish Vithal Joshi, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 212 days.

(21) Appl. No.: 13/415,553

(22) Filed: Mar. 8, 2012

(65) Prior Publication Data

US 2013/0176272 A1 Jul. 11, 2013

Related U.S. Application Data

(60) Provisional application No. 61/584,477, filed on Jan. 9, 2012.

(51) Int. Cl.
*G06F 3/044* (2006.01)
*G06F 3/041* (2006.01)

(52) U.S. Cl.
CPC ................ *G06F 3/044* (2013.01); *G06F 3/041* (2013.01); *G06F 3/0416* (2013.01)

(58) Field of Classification Search
CPC ........................................................ G06F 3/044
USPC .......................................................... 345/173
See application file for complete search history.

(56) References Cited

U.S. PATENT DOCUMENTS

2005/0212777 A1* 9/2005 Ing ........................ G06F 3/0433 345/173
2006/0071912 A1* 4/2006 Hill ....................... G06F 3/0416 345/173
2008/0088588 A1* 4/2008 Kitaura ................. G06F 3/0304 345/158
2008/0158179 A1* 7/2008 Wilson .................... G06F 3/044 345/173
2009/0184935 A1* 7/2009 Kim ...................... G06F 3/0488 345/173
2010/0085325 A1* 4/2010 King-Smith ........ G06F 3/03545 345/174
2011/0050620 A1* 3/2011 Hristov ................. G06F 3/0416 345/174
2011/0063229 A1* 3/2011 Krah ..................... G06F 3/0418 345/173

* cited by examiner

*Primary Examiner* — Srilakshmi K Kumar
*Assistant Examiner* — Carl Adams
(74) *Attorney, Agent, or Firm* — Brinks Gilson & Lione

(57) ABSTRACT

Adaptive reconfiguration of a capacitive touch controller is implemented by estimating the interference spectrum of the signal received by the touch controller. The spectrum of the received signal is used to determine a desired frequency, and the touch panel transmitter is configured to use that desired frequency. The spectrum of the received signal is also used to determine an desired filter transfer function. A filter in the touch panel received signal path is configured to use that desired filter transfer function. The adaptive reconfiguration is focused on improving the signal to noise ratio of the received signal without the need for shielding the touch panel, performing additional scans of the touch panel, or using components that operate at higher power levels.

17 Claims, 18 Drawing Sheets

| Row Index | 0 | 1 | 2 | 3 | 4 |
|---|---|---|---|---|---|
| 0 | 2 | 2 | 2 | 2 | 2 |
| 1 | 2 | 2 | 2 | 2 | 2 |
| 2 | 2 | 2 | 2 | 2 | 2 |
| 3 | 2 | 2 | 2 | 2 | 2 |
| 4 | 4 | 4 | 4 | 4 | 4 |
| 5 | 4 | 4 | 4 | 4 | 4 |
| 6 | 4 | 4 | 4 | 4 | 4 |
| 7 | 4 | 4 | 4 | 4 | 4 |

Column Index

| Row Index | Column Index 0 | 1 | 2 | 3 | 4 |
|---|---|---|---|---|---|
| 0 | 2 | 2 | 2 | 2 | 2 |
| 1 | 2 | 2 | 2 | 2 | 2 |
| 2 | 2 | 2 | 2 | 2 | 2 |
| 3 | 2 | 2 | 2 | 2 | 2 |
| 4 | 2 | 2 | 2 | 2 | 2 |
| 5 | 4 | 4 | 4 | 4 | 4 |
| 6 | 4 | 4 | 4 | 4 | 4 |
| 7 | 4 | 4 | 4 | 4 | 4 |

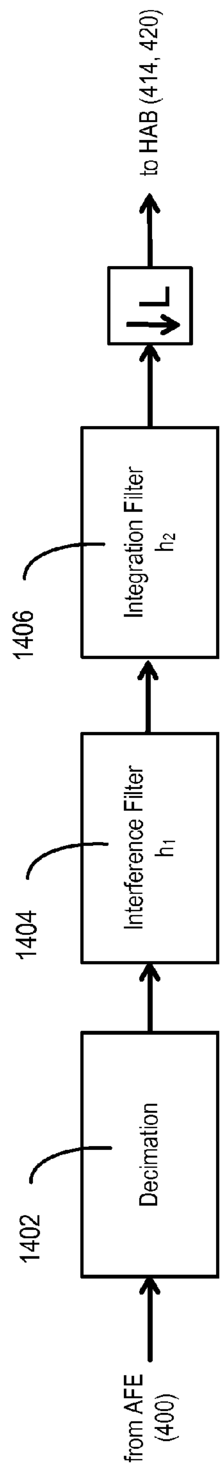
Figure 14A
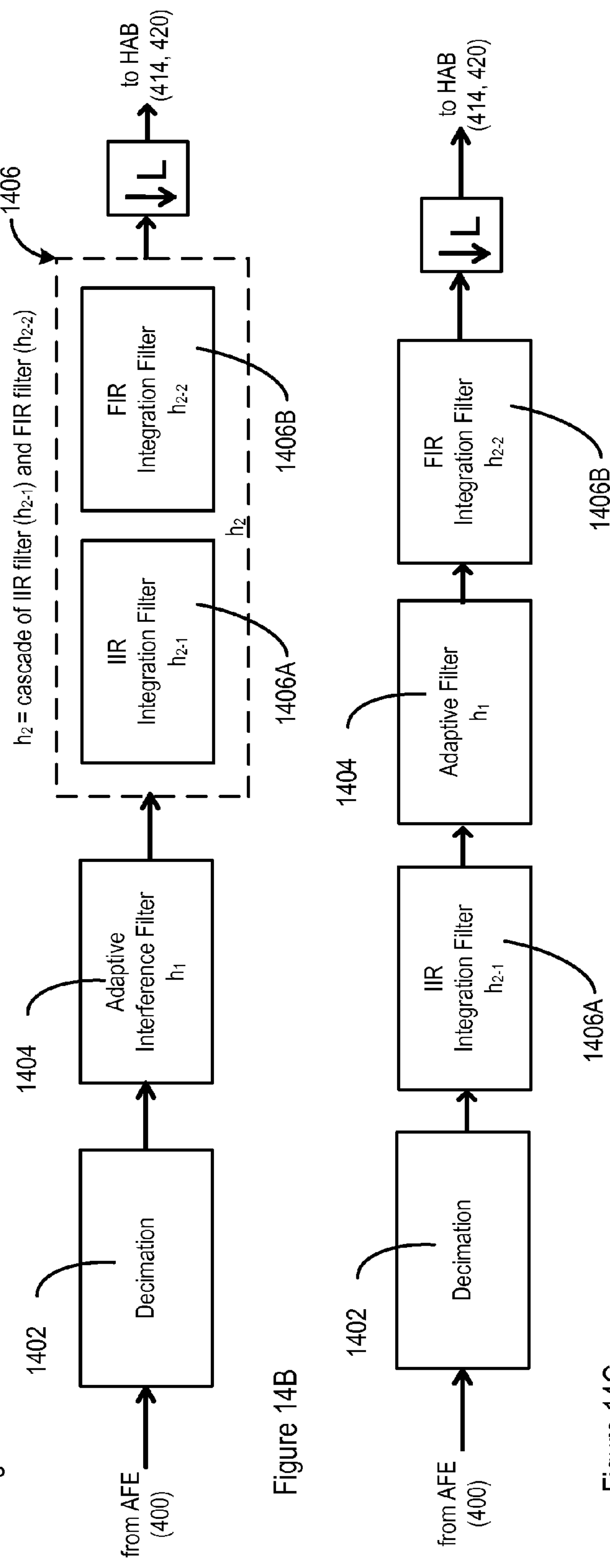
Figure 14B
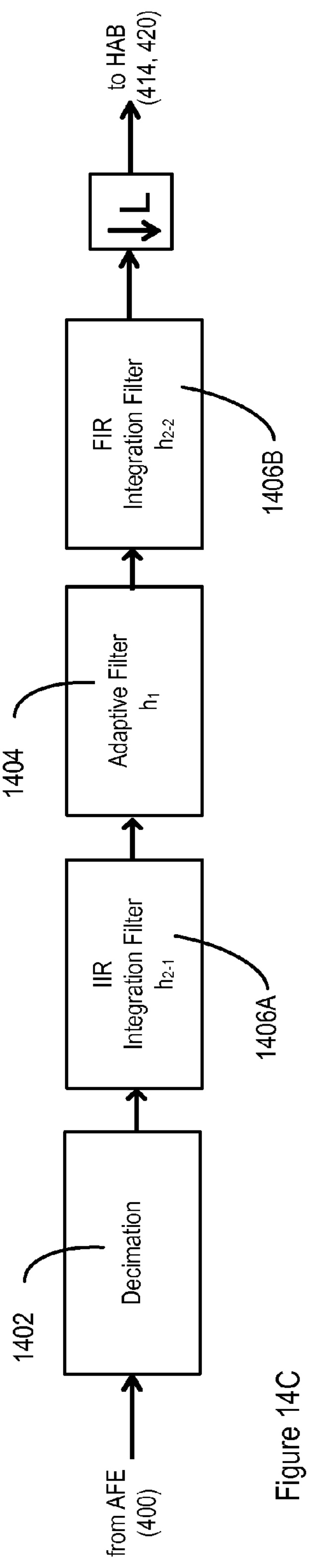
Figure 14C
Figure 14

INTERFERENCE ESTIMATION AND ADAPTIVE RECONFIGURATION OF A CAPACITIVE TOUCH CONTROLLER

CROSS REFERENCE TO RELATED APPLICATION

The present application claims the benefit of the filing date under 35 U.S.C. §119(e) of Provisional U.S. Patent Application Ser. No. 61/584,477, which was filed on Jan. 9, 2012, and is hereby incorporated herein by reference in its entirety.

TECHNICAL FIELD

This disclosure relates to methods and apparatus for capacitive touch screen devices.

BACKGROUND

Continual development and rapid improvement in portable devices has included the incorporation of touch screens in these devices. A touch screen device responds to a user's touch to convey information about that touch to a control circuit of the portable device. The touch screen is conventionally combined with a generally coextensive display device such as a liquid crystal display (LCD) to form a user interface for the portable device. The touch screen also operates with a touch controller circuit to form a touch screen device. In other applications using touch sensing, touch pads may also be part of the user interface for a device such as a personal computer, taking the place of a separate mouse for user interaction with the onscreen image. Relative to portable devices that include a keypad, rollerball, joystick or mouse, the touch screen device provides advantages of reduced moving parts, durability, resistance to contaminants, simplified user interaction and increased user interface flexibility.

Despite these advantages, conventional touch screen devices have been limited in their usage to date. For some devices, current drain has been too great. Current drain directly affects power dissipation which is a key operating parameter in a portable device. For other devices, performance such as response time has been poor, especially when subjected to fast motion at the surface of the touch screen. Some devices do not operate well in environments with extreme conditions for electromagnetic interference and contaminants that can affect performance.

Further limitations and disadvantages of conventional and traditional approaches will become apparent to one of ordinary skill in the art through comparison of such approaches with aspects of the present disclosure as set forth in the remainder of this application and with reference to the accompanying drawings.

BRIEF DESCRIPTION OF THE DRAWINGS

The system may be better understood with reference to the following drawings and description. In the figures, like reference numerals designate corresponding parts throughout the different views.

FIG. 5 shows an exemplary first sample asymmetric scan map.

FIG. 6 shows an exemplary second sample asymmetric scan map.

FIG. 14A shows an implementation of a single ended scan data path with decimation, interference, and integration filters.

FIG. 14B shows an implementation of a single ended scan data path with decimation, interference, and integration filters, where the integration filter is an infinite impulse response (IIR) filter cascaded with a finite impulse response (FIR) filter.

FIG. 14C shows an implementation of an exemplary single ended scan data path with decimation, interference, and integration filters, where the integration filter is an infinite impulse response (IIR) filter cascaded with a finite impulse response (FIR) filter.

DETAILED DESCRIPTION

Figure 1:
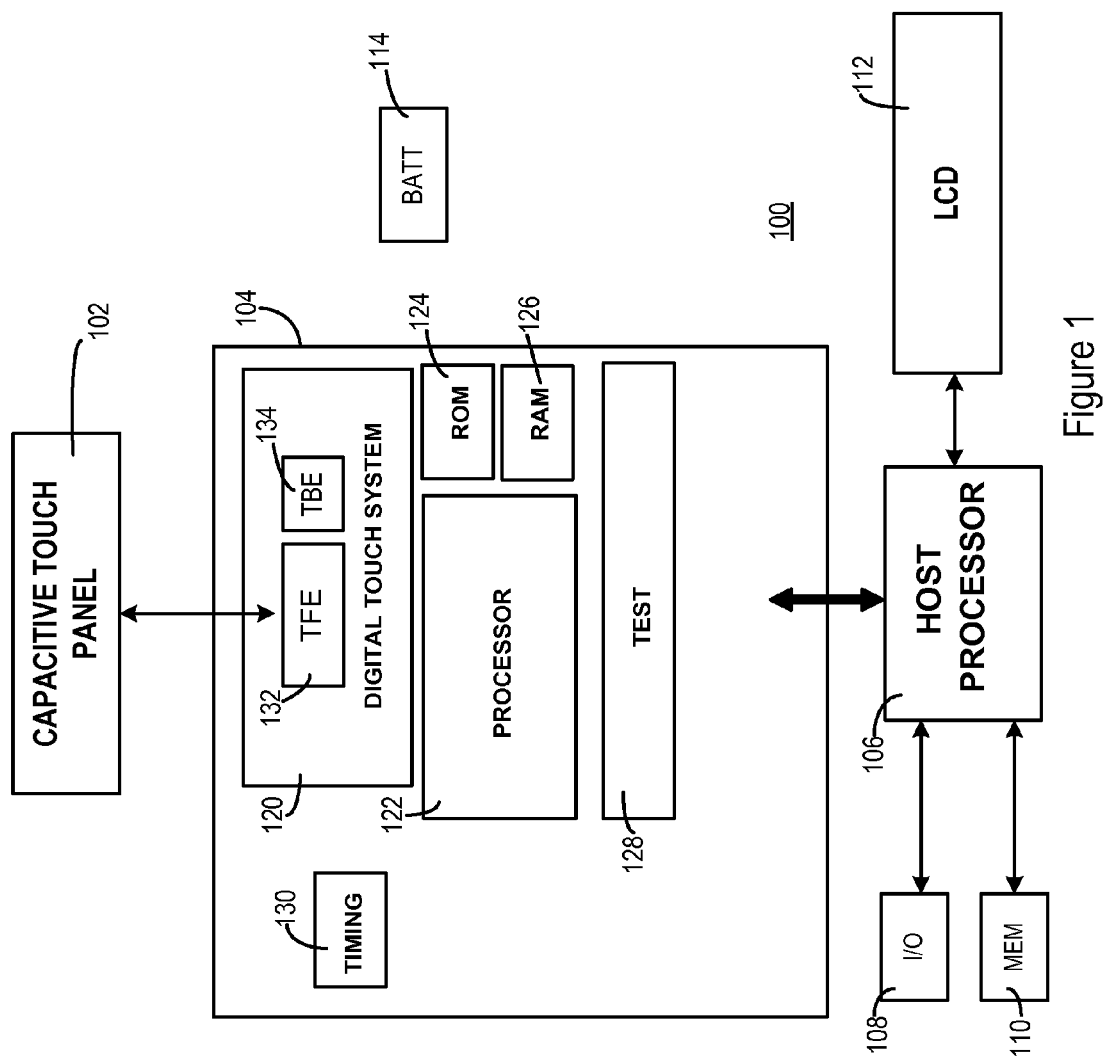
FIG. 1 is a block diagram of an exemplary portable device.

Referring now to FIGS. 1 and 2, FIG. 1 shows a block diagram of a portable device 100. FIG. 2 is one embodiment of a portable device 100 according to the block diagram of FIG. 1. As shown in FIG. 1, the portable device 100 includes a capacitive touch panel 102, a controller circuit 104, a host processor 106, input-output circuit 108, memory 110, a liquid crystal display (LCD) 112 and a battery 114 to provide operating power.

Figure 2B:
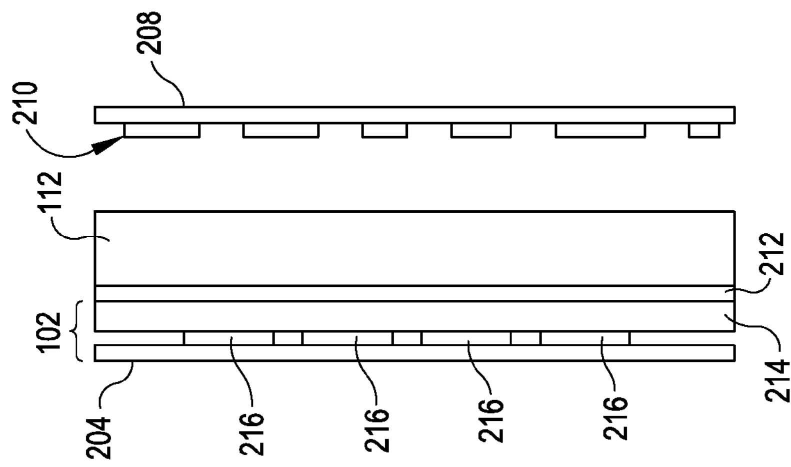
FIG. 2 includes FIG. 2A which shows a top view of a portable device and FIG. 2B which shows a cross-sectional view of the portable device along the line B-B'.
Figure 2A:
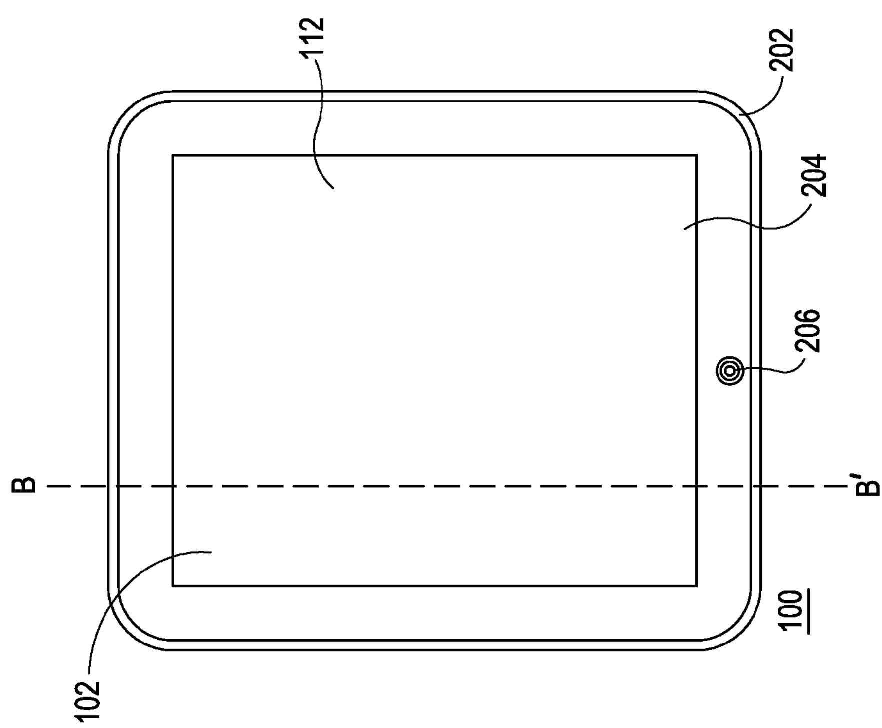

FIG. 2 includes FIG. 2A which shows a top view of the portable device 100 and FIG. 2B which shows a cross-sectional view of the portable device 200 along the line B-B'. The portable device may be embodied as the widest variety of devices including as a tablet computer, a smart phone, or even as a fixed device with a touch-sensitive surface or display.

The portable device 100 includes a housing 202, a lens or clear touch surface 204 and one or more actuatable user interface elements such as a control switch 206. Contained within the housing are a printed circuit board 208 circuit elements 210 arranged on the printed circuit board 208 and as are shown in block diagram form in FIG. 1. The capacitive touch panel 102 is arranged in a stack and includes a drive line 212, an insulator 214 and a sense line 216. The insulator electrically isolates the drive line 212 and other drive lines arranged parallel to the drive line from the sense lines 216. Signals are provided to one or more of the drive lines 212 and sensed by the sense lines 216 to locate a touch event on the clear touch surface 204. The LCD 112 is located between the printed circuit board 208 and the capacitive touch panel 102.

As particularly shown in FIG. 2A, the capacitive touch panel 102 and the LCD 112 may be generally coextensive and form a user interface for the portable device. Text and images may be displayed on the LCD for viewing and interaction by a user. The user may touch the capacitive touch panel 102 to control operation of the portable device 100. The touch may be by a single finger of the user or by several fingers, or by other portions of the user's hand or other body parts. The touch may also be by a stylus gripped by the user or otherwise brought into contact with the capacitive touch panel. Touches may be intentional or inadvertent. In another application, the capacitive touch panel 102 may be embodied as a touch pad of a computing device. In such an application, the LCD 112 need not be coextensive (or co-located) with the capacitive touch panel 102 but may be located nearby for viewing by a user who touches the capacitive touch panel 102 to control the computing device.

Referring again to FIG. 1, the controller circuit 104 includes a digital touch system 120, a processor 122, memory including persistent memory 124 and read-write memory 126, a test circuit 128 and a timing circuit 130. In one embodiment, the controller circuit 104 is implemented as a single integrated circuit including digital logic and memory and analog functions.

The digital touch subsystem 120 includes a touch front end (TFE) 132 and a touch back end (TBE) 134. This partition is not fixed or rigid, but may vary according to the high-level function(s) that each block performs and that are assigned or considered front end or back end functions. The TFE 132 operates to detect the capacitance of the capacitive sensor that comprises the capacitive touch-panel 102 and to deliver a high signal to noise ratio (SNR) capacitive image (or heatmap) to the TBE 134. The TBE 134 takes this capacitive heatmap from the TFE 132 and discriminates, classifies, locates, and tracks the object(s) touching the capacitive touch panel 102 and reports this information back to the host processor 106. The TFE 132 and the TBE 134 may be partitioned among hardware and software or firmware components as desired, e.g., according to any particular design requirements. In one embodiment, the TFE 132 will be largely implemented in hardware components and some or all of the functionality of the TBE 134 may be implemented by the processor 122.

The processor 122 operates in response to data and instructions stored in memory to control the operation of the controller circuit 104. In one embodiment, the processor 122 is a reduced instruction set computer (RISC) architecture, for example as implemented in an ARM processor available from ARM Holdings. The processor 122 receives data from and provides data to other components of the controller circuit 104. The processor 122 operates in response to data and instructions stored in the persistent memory 124 and read-write memory 126 and in operation writes data to the memories 124, 126. In particular, the persistent memory 124 may store firmware data and instructions which are used by any of the functional blocks of the controller circuit 104. These data and instructions may be programmed at the time of manufacture of the controller 104 for subsequent use, or may be updated or programmed after manufacture.

The timing circuit 130 produces clock signals and analog, time-varying signals for use by other components of the controller circuit 104. The clock signals include digital clock signals for synchronizing digital components such as the processor 122. The time-varying signals include signals of predetermined frequency and amplitude for driving the capacitive touch panel 102. In this regard, the timing circuit 130 may operate under control or responsive to other functional blocks such as the processor 122 or the persistent memory 124.

Figure 3:
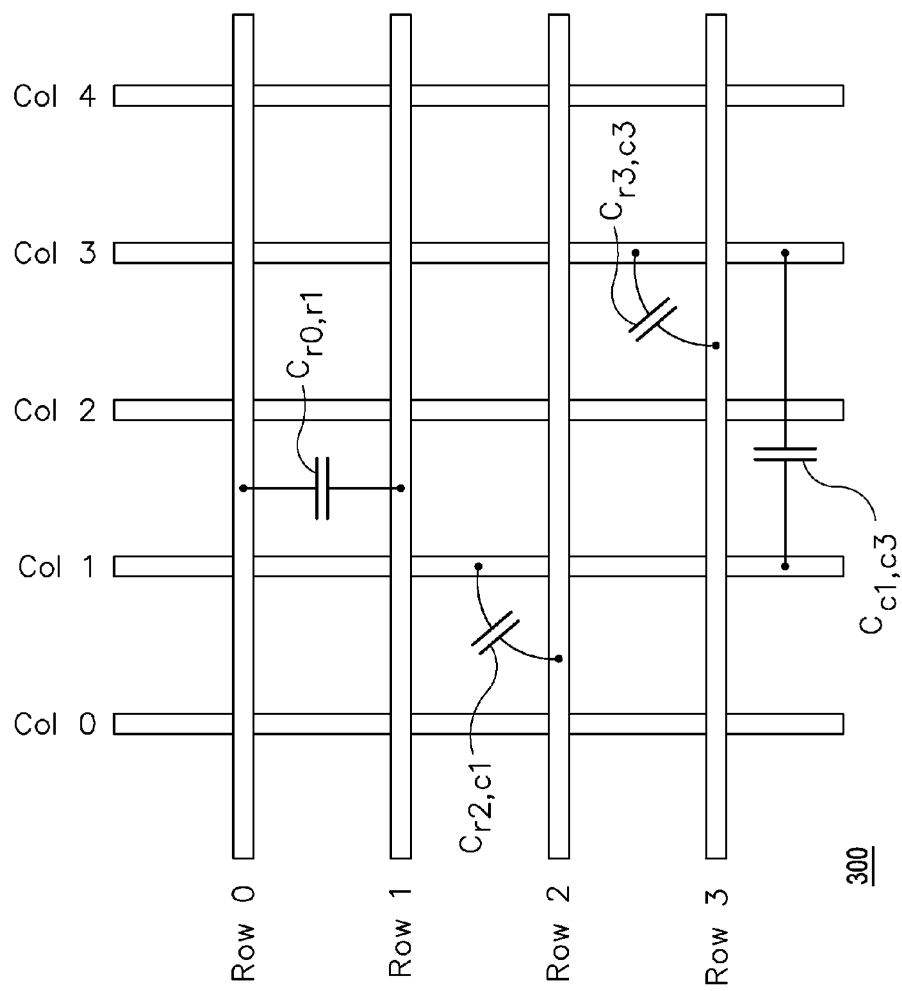
FIG. 3 is a simplified diagram of an exemplary mutual capacitance touch panel for use in the portable device of FIGS. 1 and 2.

FIG. 3 shows a diagram of a typical mutual capacitance touch panel 300. The capacitive touch panel 300 models the capacitive touch panel 102 of the portable device of FIGS. 1 and 2. The capacitive touch panel 300 has $N_{row}$ rows and $N_{col}$ columns ($N_{row}=4$, $N_{col}=5$ in FIG. 3). In this manner, the capacitive touch panel 300 creates $N_{row}\times N_{col}$ mutual capacitors between the $N_{row}$ rows and the $N_{col}$ columns. These are the mutual capacitances that the controller circuit 104 commonly uses to sense touch, as they create a natural grid of capacitive nodes that the controller circuit 104 uses to create the typical capacitive heatmap. However, it is worth noting that there are a total of ($N_{row}+N_{col}$)—or ($N_{row}N_{col}+2$) nodes if a touching finger or stylus and ground node in the capacitive touch panel 300 are included. A capacitance exists between every pair of nodes in the capacitive touch panel 300.

Stimulus Modes

The capacitive touch panel 300 can be stimulated in several different manners. The way in which the capacitive touch panel 300 is stimulated impacts which of the mutual capacitances within the panel are measured. A list of the modes of operation is detailed below. Note that the modes defined below only describe the manner in which the TFE 132 stimulates the panel.

Row-column (RC) mode is a first operating mode of a mutual capacitive sensor. In RC mode, the rows are driven with transmit (TX) waveforms and the columns are connected to receive (RX) channels of the TFE 132. Therefore, the mutual capacitors between the rows and the columns are detected, yielding the standard $N_{row}\times N_{col}$ capacitive heatmap. In the example shown in FIG. 3, RC mode measures the capacitors labeled $C_{r<i>,c<j>}$, where <i> and <j> are integer indices of the row and column, respectively. Generally, there is no incremental value in supporting column-row (CR) mode, (e.g. driving the columns and sensing the rows), as it yields the same results as RC mode.

Self-capacitance column (SC) mode is a self-capacitance mode that may be supported by the controller 102. In SC mode, one or more columns are simultaneously driven and sensed. As a result, the total capacitance of all structures connected to the driven column can be detected.

In column-listening (CL) mode, the RX channels are connected to the columns of the capacitive touch panel 102 and the transmitter is turned off. The rows of the capacitive touch panel 102 will either be shorted to a low-impedance node (e.g. AC ground), or left floating (e.g. high-impedance). This mode is used to listen to the noise and interference present on the panel columns. The output of the RX channels will be fed to a spectrum estimation block in order to determine the appropriate transmit signal frequencies to use and the optimal interference filter configuration, as will be described in further detail below.

Timing Terminology

Some terminology is introduced for understanding the various timescales by which results are produced within the TFE 132. The TFE 132 produces a capacitive heatmap by scanning all desired nodes of the capacitive touch panel 102 (e.g., all of the nodes, or some specified or relevant subset of all of the nodes). This process may be referred to as a frame scan; the frame scan may run at a rate referred to as the frame rate. The frame rate may be scalable. One exemplary frame rate includes a frame rate of 250 Hz for single touch and a panel size less than or equal to 5.0 inches in size. A second exemplary frame rate is 200 Hz for single touch and a panel size greater than 5.0 inches. A third exemplary frame rate is 120 Hz minimum for 10 touches and a panel size of 10.1 inches. Preferably, the controller 104 can support all of these frame rates and the frame rate is configurable to optimize tradeoff of performance and power consumption for a given application. The term scan rate may be used interchangeably with the term frame rate.

The controller circuit 104 may assemble a complete frame scan by taking a number of step scans. Qualitatively, each step scan may result in a set of capacitive readings from the receivers, though this may not be strictly done in all instances. The controller circuit 104 may perform each step scan at the same or different step rate. For row/column (RC) scan, where the transmitters are connected to the rows and the receivers are connected to the columns, it will take $N_{row}$ step scans to create a full frame scan. Assuming a tablet-sized capacitive touch panel 102 with size 40 rows×30 columns, the step rate may be at least 8 kHz to achieve a 200 Hz frame rate.

For all mutual-capacitance scan modes a touch event causes a reduction in the mutual capacitance measured. The capacitive heatmap that is created by the TFE 132 will be directly proportional to the measured capacitance. Therefore, a touch event in these scan modes will cause a reduction in the capacitive heatmap. For all self-capacitance scan modes, a touch event causes an increase in the capacitance measured. The capacitive heatmap that is created by the TFE 132 will be directly proportional to the measured capacitance. Therefore, a touch event in these scan modes will cause a local increase in the capacitive heatmap.

Figure 4:
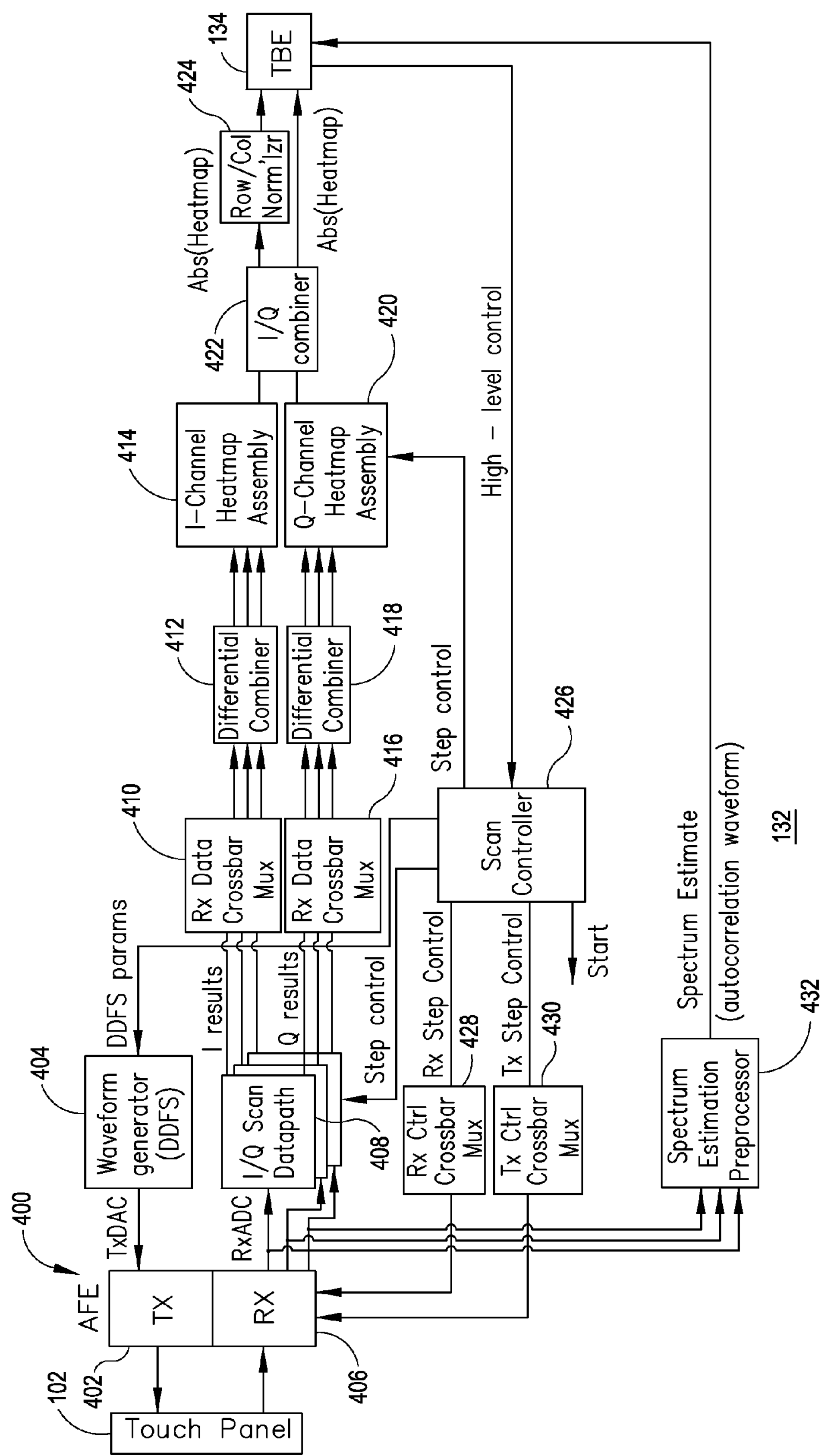
FIG. 4 shows an exemplary block diagram of the touch front end of the portable device of FIG. 1.

Referring now to FIG. 4, it shows a block diagram of the touch front end (TFE) 132 of FIG. 1. In the illustrated embodiment, the TFE 132 includes 48 physical transmit channels and 32 physical receive channels. Additionally, some embodiments of the TFE 132 may contain circuitry such as power regulation circuits, bias generation circuits, and clock generation circuitry. To avoid unduly crowding the drawing figure, such miscellaneous circuitry is not shown in FIG. 4.

The TFE 132 includes transmit channels 402, a waveform generation block 404, receive channels 406 and I/Q scan data paths 408. The transmit channels 402 and the receive channels 406 collectively may be referred to as the analog front end (AFE) 400. The TFE 132 further includes, for the in-phase results from the I/Q scan data path, a receive data crossbar multiplexer 410, a differential combiner 412 and an in-phase channel assembly block 414. Similarly for the quadrature results, the TFE 132 includes a receive data crossbar multiplexer 416, a differential combiner 418 and an in-phase channel assembly block 420. The in-phase results and the quadrature results are combined in an I/Q combiner 422. The absolute value of the data is provided to a row and column normalizer 424 and then made available to the touch back end (TBE) 134. Similarly, the heatmap phase information from the I/Q combiner 422 is provided to the TBE 134 as well.

The TFE 132 further includes a scan controller 426, read control crossbar multiplexer 428 and transmit control crossbar multiplexer 430. Further, the TFE 132 includes a spectrum estimation processor 426 as will be described below in further detail. The spectrum estimation processor 426 provides a spectrum estimate to the TBE 134. The scan controller 426 receives high level control signals from the TBE 134 to control which columns are provided with transmit signals and which rows are sensed.

The receive data crossbar multiplexers 410, 416 and the receive control crossbar multiplexer 428 together form a receive crossbar multiplexer. These two multiplexers are used to logically remap the physical receive TFE channels by remapping both their control inputs and data outputs. As such, the control signals routed to both multiplexers may be identical, as the remapping performed by the receive data multiplexers 410, 416 and the receive control multiplexer 428 needs to be identical.

The receive data crossbar multiplexers 410, 416 sit between the output of the I/Q scan data path 408 and the heatmap assembly blocks 414, 420. The purpose of the receive data crossbar multiplexers 410, 416 is to enable the logical remapping of the receive channels. This in turn allows for logical remapping of the electrical connectors such as pins or balls which connect the integrated circuit including the controller 104 to other circuit components of the portable device 100. This will in turn enable greater flexibility in routing a printed circuit board from the integrated circuit including the controller 104 to the capacitive touch panel 102.

Since the I/Q scan data path 408 outputs complex results, the receive crossbar multiplexer may be able to route both the I and Q channels of the scan data path output. This can easily be achieved by instantiating two separate and identical crossbar multiplexers 410, 416. These two multiplexers will share the same control inputs.

The receive control crossbar multiplexer 428 sits between the scan controller 426 and the AFE 400. It is used to remap the per-channel receive control inputs going into the AFE 400. The structure of the receive control crossbar multiplexer 428 may be the same as for the receive data crossbar multiplexers 410, 416.

Since the Rx Ctrl crossbar is used in conjunction with the Rx Data crossbar to logically remap the RX channels, it may be programmed in conjunction with the Rx data crossbar. The programming of the receive control multiplexer 428 and the receive data crossbar multiplexers 410, 416 are not identical. Instead the programming may be configured so that the same AFE to controller channel mapping achieved in one multiplexer is implemented in the other.

The scan controller 426 forms the central controller that facilitates scanning of the capacitive touch panel 102 and processing of the output data in order to create the capacitive heatmap. The scan controller 426 operates in response to control signals from the TBE 134.

Scan Controller Modes of Operation

The scan controller 426 may support many different modes. A brief description of each mode is listed below. Switching between modes is typically performed at the request of the processor 122 (FIG. 1), with a few exceptions noted below.

Active scan mode is considered the standard mode of operation, where the controller 104 is actively scanning the capacitive touch panel 102 in order to measure the capacitive heatmap. Regardless of what form of panel scan is utilized, the scan controller 426 steps through a sequence of step scans in order to complete a single frame scan.

In single-frame mode, the controller initiates one single frame scan at the request of the processor 122. After the scan is complete, the capacitive heatmap data is made available to the processor 122 and the scan controller 426 suspends further operation until additional instructions are received from the processor 426. This mode is especially useful in chip debugging.

In single-step mode, the controller initiates one single step scan at the request of the processor 122. After the scan is complete, the outputs of the scan data path 408 are made available to the processor 122 and the scan controller 426 suspends further operation until additional instructions are received from the processor 122. This mode is especially useful in chip testing and debugging.

Idle scan mode is a mode initiated by the processor 122 in order to run the controller 104 in a lower-performance mode. Typically, this mode will be selected when the controller 122 does not detect an active touch on the screen of the capacitive touch panel 102, but still wants reasonably fast response to a new touch. Therefore, the controller 122 is still active and capable of processing the heatmap data produced by the TFE 132.

The primary differences between active scan mode and idle scan mode are twofold. First, the frame rate in idle scan mode will typically be slower than that used in active scan mode. Duty cycling of the AFE 400 and other power reduction modes will be used in order to reduce total power consumption of the controller 104 during idle scan. Second, the length of time used to generate a single frame scan may be shorter in idle scan mode than in active scan mode. This may be achieved by either shortening the duration of a step scan or by performing fewer step scans per frame. Reducing total frame scan time can further reduce power at the expense of reduced capacitive heatmap signal to noise ratio (SNR).

Spectrum estimation mode is used to measure the interference and noise spectrum coupling into the receive channels. This measurement is then analyzed by the processor 122 to determine the appropriate transmit frequency and calculate the optimal filter coefficients for the filters within the scan data path 408. This mode is typically used with the Column Listening mode.

In spectrum estimation mode, most of the blocks of the TFE 132 in FIG. 4 are disabled. The scan controller 426, the AFE 400, and the spectrum estimation preprocessor 432 may be used. The transmit channel 402 of the AFE 400 is powered down, and the receive channel 406 of the AFE 400 records the background noise and interference signals that couple into the capacitive touch panel 102. The receive data from all of the channels of the AFE 400 are routed to the spectrum estimation preprocessor 432, which performs mathematical preprocessing on this data. The output of the spectrum estimation preprocessor 432 will be an N-point vector of 16-bit results, where N is approximately 200 when the sample rate is approximately 2 MHz. The output of the spectrum estimation preprocessor 432 is handed off to the processor 122 for further analysis and determination of the appropriate transmit frequency to use. This process is described in greater detail below.

In addition to the functional modes described above, the controller 104 may have a set of sleep modes, where various functional blocks in the controller 104 are disabled and/or powered down completely.

A frame scan includes of a series of step scans. The structure of each step scan may be identical from step scan to the next within a given frame scan; however, the exact values of control data vary from step scan to step scan. Furthermore, the operation of a given frame scan may be determined by configuration parameters and may or may not affected by data values measured by the receive channel. One example of the frame scan logic that the controller circuit 104 may implement is shown below.

```
// Initialization
Set DDFS parameters;
Clear heatmap_memory;
// Step scan loop
For step_idx = 1 to num_step_scans {
        // Configure circuits according to step_idx
        Set scan_datapath_control to
        scan_datapath_parameters[step_idx];
        Assert Rx_reset and wait TBD clock cycles;
        Set AFE_control_inputs to AFE_parameters[step_idx];
        Deassert Rx_reset and wait TBD clock cycles;
        // Run step scan and collect data
        Send start signal to DDFS and scan data path;
        Wait for TBD clock cycles for step scan to complete;
        Pass datapath_results[step_idx] to heatmap assembly block
        // Incremental heatmap processing
} // step_idx loop
```

The incremental heatmap processing operation is described in greater detail below.

Multi-Transmit Support and Block Stimulation of the Panel

In order to achieve improved SNR in the capacitive heatmap, the controller circuit 104 provides support for multi-transmit (multi-Tx) stimulation of the capacitive control panel 102. Multi-Tx stimulation (or Multi-Tx) means that multiple rows of the panel are simultaneously stimulated with the transmit (Tx) signal, or a polarity-inverted version of the Tx signal, during each step scan. The number and polarity of the rows stimulated, may be controlled through control registers in the AFE 400. The number of rows simultaneously stimulated during multi-Tx is defined as a parameter $N_{multi}$. $N_{multi}$ may be a constant value from step-to-step within a given frame and also from frame-to-frame.

If $N_{multi}$ rows are simultaneously stimulated during a step scan, it will take at least $N_{multi}$ step scans to resolve all the pixel capacitances being stimulated. Each receiver has $N_{multi}$ capacitances being stimulated during a scan step. Hence there are $N_{multi}$ unknown capacitances, requiring at least $N_{multi}$ measurements to resolve these values. During each of these $N_{multi}$ steps, the polarity control of the Tx rows will be modulated by a set of Hadamard sequences. Once this set of $N_{multi}$ (or more) step scans is complete, the next set of $N_{multi}$ rows can be stimulated in the same fashion, as $N_{multi}$ will almost always be less than the number of actual rows in the capacitive touch panel 102.

In this way, the processing of the entire capacitive touch panel 102 occurs in blocks, where $N_{multi}$ rows of pixels are resolved during one batch of step scans, and then the next $N_{multi}$ rows of pixels are resolved in the next batch of step scans, until all the panel rows are fully resolved.

In most scenarios, the number of panel rows will not be an exact multiple of $N_{multi}$. In these situations, the number of rows scanned during the final block of rows will be less than $N_{multi}$. However, $N_{multi}$ scan steps may be performed on these remaining rows, using specified non-square Hadamard matrices.

Analog Front End and Asymmetric Scan

FIGS. 5 and 6 show examples of asymmetric scan maps 500 and 600.

Figure 7:
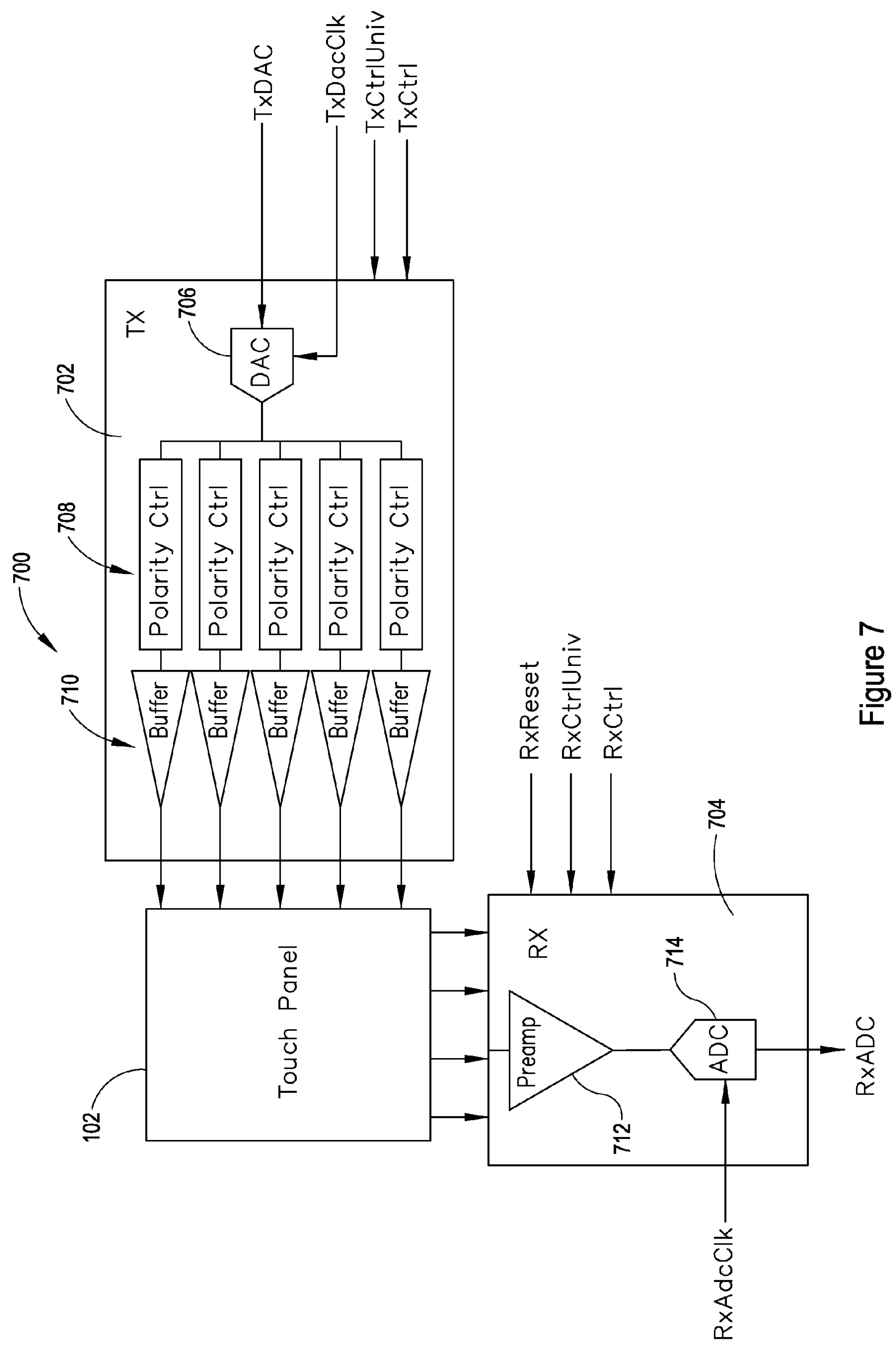
FIG. 7 shows an exemplary high-level architecture of the touch front end of the portable device of FIG. 1.

FIG. 7 shows a high-level architecture 700 of the analog front end 400 (FIG. 4). The architecture 700 includes a transmit channel 702 providing signals to columns of the capacitive touch panel 102 and a receive channel 704 sensing signals from the capacitive touch panel 102. The transmit channel 702 includes a digital to analog converter 706, polarity control circuits 708 and buffers 710. The receive channel 704 includes a pre-amplifier 712 and analog to digital converter 714.

All transmit channels may be driven by a shared transmit data signal labeled TxDAC in FIG. 7. Each physical transmit channel may also receive a common transmit digital to analog converter clock signal, labeled TxDacClk, to drive the transmit digital to analog converter 706. The clock signal will come directly from a frequency locked loop block within the TFE 132, and this clock signal will also be routed to the digital portion of the TFE 132.

Each physical transmit channel may also have its own set of channel-specific TxCtrl bits that appropriately control various parameters of the transmit channel, such as enable/disable, polarity control, and gain/phase control. These TxCtrl bits are not updated at the TxDacClk rate, but rather are updated between subsequent step scans during the frame scan operation.

A control signal controls the transmit polarity of each of the 48 transmit channels. As will be described in greater detail below, the polarity of the transmit outputs may be modulated in an orthogonal sequence, with each transmit output having a fixed polarity during each scan step during a frame scan.

All receive channels will receive a set of common clock signals. These clock signals are provided directly from a frequency locked loop block within the TFE 132, and this clock signal is also routed to the digital portion of the TFE 132. The clock signals routed to the RX channels include the signal RxADCClk which drives the RxADC. A typical clock frequency for this signal is 48 MHz.

Each physical receive channel will also have its own set of channel-specific receive control bits, labeled RxCtrl in FIG. 7, that appropriately control various parameters of the receive channel, such as enable/disable and gain control. These receive control bits are updated between subsequent step scans during the frame scan operation.

Additionally, there may be a shared set of control settings, labelled RxCtrlUniv in FIG. 7, that will control all receive channels simultaneously. These registers are primarily composed of generic control bits that will remain constant for a given implementation of the controller 104.

There are also one or more reset lines labeled RxReset that are common to all reset channels. These reset lines may be asserted in a repeatable fashion prior to each scan step.

Waveform Generation

The waveform generation block (WGB) 404 in FIG. 4 generates the transmit waveform for the TX channels 402. The WGB 404 generates a digital sine wave. Additionally, WGB 404 may generate other simple periodic waveforms; such as square waves having edges with programmable rise and fall times.

The primary output of the WGB 404 is the data input to the transmit channels 402 labelled TxDAC in FIG. 4. The WGB 404 receives as input signals a clock signal labelled TxDacClk and a signal labelled Start in FIG. 4. Upon receiving the Start signal from the scan controller 426, the WGB 404 begins producing digital waveforms for the duration of a single step scan. At the conclusion of the step scan, the WGB 404 ceases operation and waits for the next start signal from the scan controller 426.

The WGB 404 may have some amount of amplitude control, but the WGB 404 will typically be operated at maximum output amplitude. Therefore, the performance requirements listed below only need to be met at max output amplitude. All signal outputs may be in two's complement format. The WGB 404 may also provide arbitrary sine/cosine calculation capabilities for the scan data path 408 and spectrum estimation preprocessor 432.

The following table lists typical performance for the WGB 404.

| Specification | Min | Nom | Max | Comment |
|---|---|---|---|---|
| Clock rate | | 8 MHz | | Will operate at TxDacClk rate. |
| Output frequency | 0 Hz | — | 2 MHz | |
| Frequency ctrl resolution | — | 15 bits | — | Desired resolution of ~61 Hz. Can be different. |
| # of output bits | — | 8 | — | |
| Output amplitude | 50% amplitude | 100% amplitude | 100% amplitude | |
| Amplitude ctrl resolution | — | 7 bits | — | Corresponds to 1% stepsize in amplitude control. |
| DC bias control | 0 | 0 | 0 | All outputs should be balanced around 0. |
| Output THD | | | −40 dBFs | Sine wave mode only. |
| Rise/fall time | 1 clock cycle @ 8 MHz | — | 256 clock cycles @ 8 MHz | Square-wave mode only. Independent control of rise time vs. fall time NOT required. |

Differential Scan Mode

Differential scan mode is an enhancement to normal scanning mode, whereby the frame scan operation is modified to exploit the correlation of the interference signal received across adjacent receive channels. In this mode, the normal frame scan methodology is performed; however the number of step scans used to assemble a single frame is doubled. Conceptually, each step scan in the scan sequence becomes two step scans: the first is a single-ended or normal step scan with the default values for the AFE control registers, and the second is a differential step scan.

Given $N_{RX}$ receive channels, the differential scan mode yields a total of $2N_{RX}$ receiver measurements per aggregate scan step. (e.g. $N_{RX}$ single-ended measurements and $N_{RX}$ differential measurements.) These $2N_{RX}$ measurements are recombined and collapsed into $N_{RX}$ normal measurements in the Differential Combiner block 412, 418 shown in FIG. 4.

In FIG. 4, the differential combiner blocks 412, 410 provide the capability to operate in differential mode, where the receive channels 406 alternate step scans between single-ended measurements and differential measurements. The purpose of the differential combiner blocks 412, 418 is to combine the $N_{RX}$ single-ended measurements and $(N_{RX}-1)$ differential measurements into a single set of $N_{RX}$ final results for use in the heatmap assembly blocks 414, 420 that follow.

The differential combiner blocks 412, 418 are akin to a spatial filter. Let the vector, c, be an $N_{rx}$-by-1 vector of the capacitances to estimate. In differential mode, you have a vector, s, of single-ended measurements and a vector, d, of differential measurements. Hence, an estimate of c, called $c_{est}$, is sought by optimally recombining s and d. Determining the optimal recombination requires substantial computation, but simulations have shown that the following recombination scheme works to within roughly 0.5 dB of optimal performance over the expected range of operating conditions:

$$c_{est,n}=a_1\cdot s_{n-2}+a_2\cdot s_{n-}+a_3\cdot s_n+a_2\cdot s_{n+1}+a_1\cdot s_{n+2}+b_1\cdot+b_2\cdot d_n-b_2\cdot d_{n+1}-b_1\cdot d_{n+2}$$

where the subscript n indicates result from the $n^{th}$ receiver channel, and $0\le n\le N_{RX}-1$.

Furthermore, the coefficients are subject to the following constraints:

$$0 \le a_1, a_2, a_3 \le 1$$

$$a_3 = 1 - 2a_1 - 2a_2$$

$$b_1 = a_1$$

$$b_2 = a_1 + a_2$$

Given these constraints, it can be observed that the math operation listed above can be collapsed into two multiplication operations:

$$c_{est,n} = s_n + a_1 \cdot (s_{n-2} - 2s_n + s_{n+2} + d_{n-1} + d_n - d_{n+1} - d_{n+2}) + a_2 \cdot (s_{n-1} - 2s_n + s_{n+1} + d_n - d_{n+1})$$

The equations above assume that the data exists for 2 receivers on either side of the nth receiver. (e.g. $2 \le n \le N_{RX} - 3$) Therefore, the equations above may be modified for the two outer edge receive channels on either side. The modifications are quite simple. First, replace any non-existent $s_k$ term with the nearest neighboring $s_j$ term that does exist. Second, replace any non-existent $d_k$ term with 0. Putting these rules together and expressing the mathematics in matrix form, we get:

$$c_{est} = \begin{bmatrix} a_1+a_2+a_3 & a_2 & a_1 & 0 & 0 & -b_2 & -b_1 & 0 & 0 \\ a_1+a_2 & a_3 & a_2 & a_1 & 0 & b_2 & -b_2 & -b_1 & 0 \\ a_1 & a_2 & a_3 & a_2 & a_1 & b_1 & b_2 & -b_2 & -b_1 \\ \vdots & \vdots & \vdots & \vdots & \vdots & \vdots & \vdots & \vdots & \vdots \\ a_1 & a_2 & a_3 & a_2 & a_1 & b_1 & b_2 & -b_2 & -b_1 \\ 0 & a_1 & a_2 & a_3 & a_2+a_1 & 0 & b_1 & b_2 & -b_2 \\ 0 & 0 & a_1 & a_2 & a_3+a_2+a_1 & 0 & 0 & b_1 & b_2 \end{bmatrix} \cdot \begin{bmatrix} s_0 \\ \vdots \\ s_{N_{RX}-1} \\ d_1 \\ \vdots \\ d_{N_{RX}-1} \end{bmatrix}$$

Lastly, while the optimal values of {a1, a2, a3, b1, b2} are dependent upon the precise noise and interference environment, it has been found that the following values for these parameters operate near optimal performance for the expected range of operating environments:

$$a_1 = 1/8$$

$$a_2 = 7/32$$

$$a_3 = 5/16$$

$$b_1 = 1/8 \cdot k_{ADC}$$

$$b_2 = 11/32 \cdot k_{ADC}$$

The parameters $b_1$ and $b_2$ above are dependent upon another parameter, $k_{ADC}$. The new parameter, $k_{ADC}$, is dependent upon the value of receive channel analog to digital converter gain (Rx_AdcGain) used during the differential measurement step, as detailed in the table below:

| Rx_AdcGain<1:0> used during differential measurement step | $k_{ADC}$ |
|---|---|
| 00 | 1 |
| 01 | ¾ |
| 10 | ½ |
| 11 | ⅜ |

These a and b coefficients should be programmable by a control source such as firmware that is part of the controller 104, but the default values should be those listed above. The table below indicates the suggested bit width for each coefficient:

| Coefficient | Bit width |
|---|---|
| $a_1$ | 5 |
| $a_2$ | 5 |
| $a_3$ | 5 |
| $b_1$ | 6 |
| $b_2$ | 8 |

The heatmap assembly blocks (HAB) 414, 420 take the step scan outputs from the scan data path 408 or differential combiners 412, 418, if used, and assemble the complete capacitive heatmap that is the major output of the frame scan operation. In order to do so, they may mathematically combine all of the step scan outputs in the appropriate manner to create estimates of the capacitance values of the individual capacitive pixels in the capacitive touch panel 102.

As shown in FIG. 4, there are two separate and identical instantiations of the HAB. A first HAB 414 is for the I-channel data and a second HAB 420 is for the Q-channel data. Each HAB 414, 418 operates on the either the I-channel or Q-channel data in order to create either an I-channel or a Q-channel capacitive heatmap.

Figure 8:
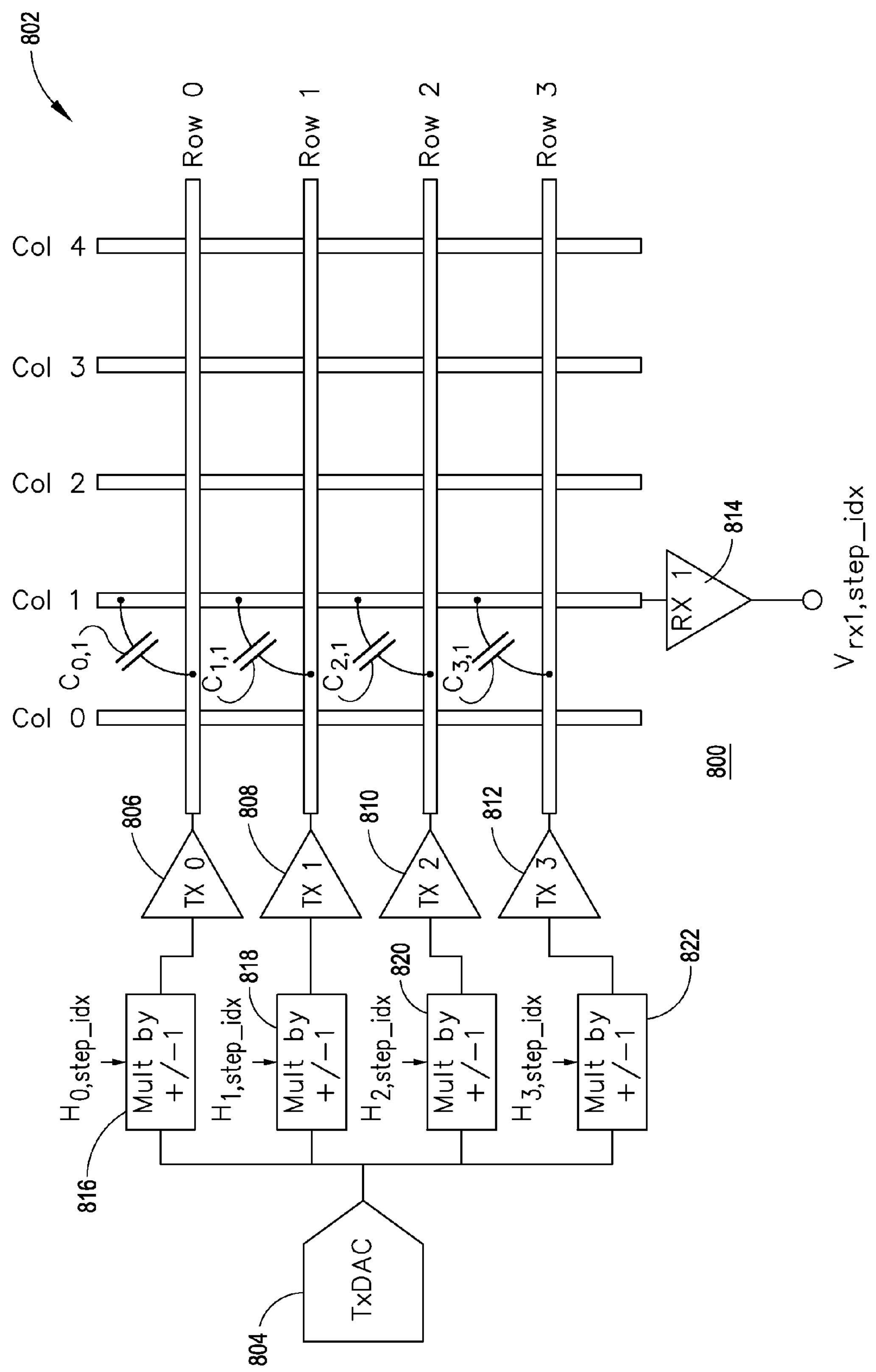
FIG. 8 shows a simplified capacitive touch panel and related circuitry.

In order to demonstrate the mathematics that may apply for heatmap assembly, an example 4×5 capacitive touch panel 800 is illustrated in FIG. 8. In this example, only the capacitive pixels in column 1 are analyzed, but the same principle can be easily extended to each of the five columns in the example capacitive touch panel 800. In particular, the output of receive column j is only affected by capacitance pixels in column j.

The example capacitive touch panel 800 includes a touch panel 802, a transmit digital to analog converter (TxDAC) 804, transmit buffers 806, 808, 810, 812, and a receive analog to digital converter 814. The transmit buffers 806, 808, 810, 812 each have an associated multiplier 816, 818, 820, 822, respectively. The multipliers 816, 818, 820, 822 operate to multiply the applied signal from the TxDAC by either +1 or −1.

In the example of FIG. 8, a single TxDAC waveform is sent to all four transmit buffers 806, 808, 810, 812. However, each buffer multiplies this waveform by either +1 or −1 before transmitting it onto the row of the touch panel 802. For a given step scan (indicated by the subscript "step_idx"), each value of $H_{i,step\_idx}$ is held constant. But for subsequent step scans in the scan sequence, these values may change. Therefore, at a given step index, the voltage received at $m^{th}$ Rx channel is:

$$V_{step\_idx,m} = V_{TX} \cdot RxGain_m \sum_{n=0}^{NumRows-1} H_{n,step\_idx} \cdot C_{n,m}$$

where $V_{TX}$ is the amplitude of the transmit signal and $RxGain_m$ is the gain of the receive channel m. In order to simplify the analysis, these two parameters are assumed to be equal to 1 and ignored in subsequent calculations.

As can be seen by this equation above, $V_{step\_idx,m}$ is based on NumRows (e.g. 4) unknown values, $C_{n,m}$, with n=0 to 3 in this example. Therefore, if four independent step scans are performed with four independent H sequences applied to the four transmit buffers 806, 808, 810, 812, the relationship between V and C can be inverted in order to estimate the C values from V. In matrix form, this can be written:

$$V_m = H \cdot C_m$$

$$V_m = \begin{bmatrix} V_{0,m} \\ V_{1,m} \\ \vdots \\ V_{NumSteps-1,m} \end{bmatrix}$$

$$H^{NumSteps,NumRows} = \begin{bmatrix} H_{0,0} & \cdots & H_{0,NumRows-1} \\ \vdots & \ddots & \vdots \\ H_{NumSteps-1,0} & \cdots & H_{NumSteps-1,NumRows-1} \end{bmatrix}$$

$$C_m = \begin{bmatrix} C_{0,m} \\ C_{1,m} \\ \vdots \\ C_{NumRows-1,m} \end{bmatrix}$$

In this formulation, the column vector $C_m$ represents the capacitance of the capacitive pixels in the $m^{th}$ column of the capacitive touch panel. H is a NumSteps×NumRows matrix, where the $n^{th}$ column of the H-matrix represents the multiplicative sequence applied to the $n^{th}$ transmit row. The optional superscript of H indicates the dimensions of the H matrix. $V_m$ is a column vector, where the $n^{th}$ entry in the matrix is the $n^{th}$ step scan output of $m^{th}$ RX channel.

In the present application, H is a special form of matrix, called a modified Hadamard matrix. These matrices have the property that:

$$H^T \cdot H = \text{NumSteps} \cdot I$$

where I is the NumRows×NumRows identity matrix, and $H^T$ is the transpose of H.

Given the formulation above, and the properties of the H-matrix, the relationship from $C_m$ to $V_m$ can be inverted in order to extract out the values of the $C_m$ vector from the $V_m$ measurements. Using the terminology defined above:

$$C_m = \frac{1}{NumSteps} H^T \cdot V_m$$

In the example above, the panel had four rows and the value of NumSteps (equivalently $N_{multi}$) was also set to four. Therefore, all panel rows were stimulated during every step scan. In general, the number of panel rows will be larger than the value of $N_{multi}$. In that case, the panel stimulation is broken up into blocks. During each block of $N_{multi}$ step scans, $N_{multi}$ adjacent rows are stimulated with the Hadamard polarity sequencing described above.

The heatmap assembly block 414, 420 works on each block of $N_{multi}$ scans independently in order to create the complete heatmap output. For instance, if there were twelve panel rows and $N_{multi}$ were set to four, then the first four step scans would be used to stimulate and assemble the first four rows of the capacitive heatmap; the next four step scans would be for the fifth through eighth panel rows; and the last four step scans would be for the ninth through twelfth rows. Therefore, for each block of $N_{multi}$ rows, the heatmap assembly block operates in the exact same manner as defined above. However, the outputs of the HAB 414, 420 are mapped to the subsequent rows in the complete capacitive heatmap.

The heatmap assembly block 414, 420 is capable of assembling a 32-column-wide heatmap, as there are a total of 32 receiver channels implemented in one embodiment. However, in many cases, the capacitive touch panel used will not have 32 columns, and hence not all 32 receive channels are used.

Mathematical Extensions for Asymmetric Panel Scanning

As described above, the controller 104 preferably has the capability to perform asymmetric panel scans, where the firmware supporting operation of the controller 104 has the capability to define the number of times each row is to be scanned. Given the formulation for asymmetric panel scanning outlined above, the changes to the heatmap assembly operation in order to support this feature are minimal.

As described above, the heatmap is assembled in blocks of $N_{multi}$ rows. In asymmetric scanning, $N_{multi}$ can vary on a block-by-block basis. Therefore, the old equation of:

$$C_m = \frac{1}{NumSteps} H^T \cdot V_m$$

is still valid. However, with asymmetric scanning, the dimensions of C, V, and H and the value of NumSteps change on a block-by-block basis.

The I/Q combiner 422 shown in 4 is used to combine the I- and Q-channel heatmaps into a single heatmap. The primary output of the I/Q combiner 422 is a heatmap of the magnitude (e.g. Sqrt[$I^2$+$Q^2$]). This is the heatmap that is handed off to the touch back end 134.

The row/column normalizer 424 shown in FIG. 4 is used to calibrate out any row-dependent or column-dependent variation in the panel response. The row/column normalizer 424 has two static control input vectors, identified as RowFac and ColFac. RowFac is an Nrow-by-1 vector, where each entry is 1.4 unsigned number (e.g. LSB=1/16. Range is 0 to 31/16). ColFac is an Ncol-by-1 vector, where each entry has the same dimensions as RowFac.

If the input data to the Row/Column Normalizer block is labeled as HeatmapIn(m,n), where m is the row index and n is the column index, the output of the block should be:

$$\text{HeatmapOut}(m,n) = \text{HeatmapIn}(m,n) \cdot \text{RowFac}(m) \cdot \text{ColFac}(n)$$

In one embodiment, the controller 104 has the capability to allow RowFac and ColFac to be defined either by OTP bits or by a firmware configuration file. The OTP settings will be used if the manufacturing flow allows for per-module calibration, thus enabling the capability to tune the controller 104 on a panel-by-panel basis. If RowFac and ColFac can only be tuned on a per-platform basis, then the settings from a firmware configuration file will be used instead.

Spectrum Estimation

The spectrum estimation preprocessor 432 operates to determine the background levels of interference that couple into the receive channels 406 so that the controller 104 may appropriately select transmit frequencies that are relatively quiet or interference free.

The spectrum estimation preprocessor 432 will generally only be used during spectrum estimation mode, so it is not part of the standard panel-scan methodology. Instead, the spectrum estimation preprocessor 432 will be used when conditions indicate that SEM should be invoked. At other times, the spectrum estimation preprocessor 432 can be powered down.

Baseline Tracking and Removal Filter

A touch event should be reported when the measured capacitance of a capacitive pixel (or group of pixels) changes by a large enough amount in a short enough period of time. However, due to slow environmental shifts in temperature, humidity or causes of drift, the absolute capacitance of a pixel (or group of pixels) can change substantially at a much slower rate. In order to discriminate changes in pixel capacitance due to a touch event from changes due to environmental drift, a baseline tracking filter can be implemented to track the changes in the baseline (e.g. untouched or ambient value of the capacitance), and simple subtraction of the baseline capacitance from the input capacitance will yield the change in capacitance due to the touch event.

Figure 9:
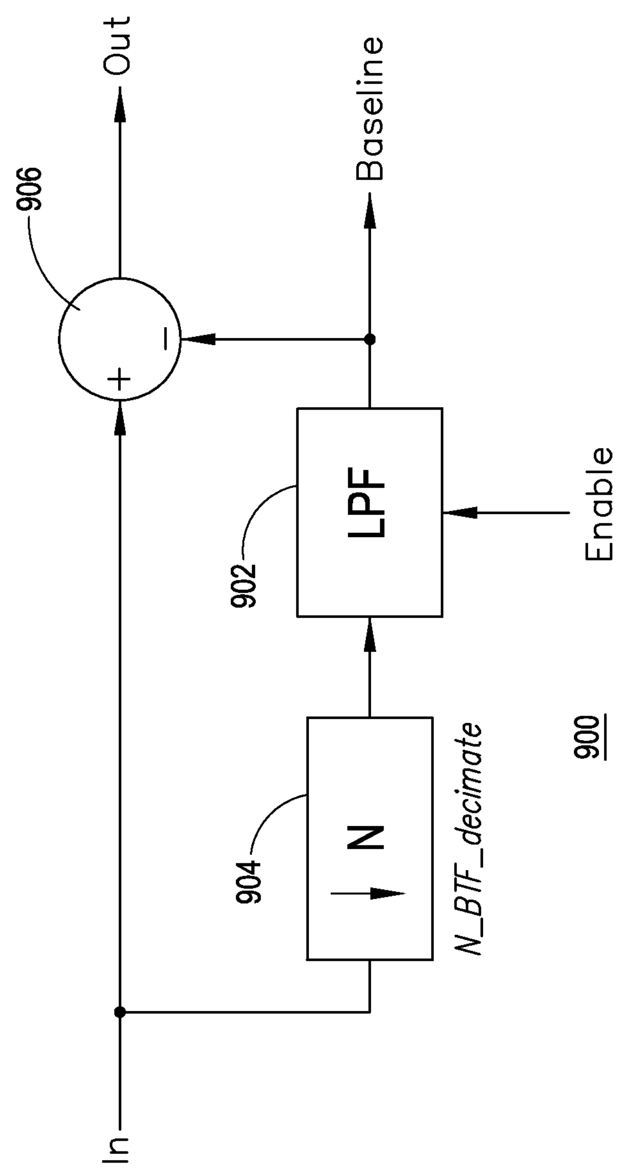
FIG. 9 illustrates an exemplary baseline tracking filter for use in a controller circuit for a portable device.

FIG. 9 illustrates a baseline tracking filter 900. The filter 900 includes a low-pass filter (LPF) 902, a decimator 904 and a combiner 906. The input signal to the filter 900 is provided to the combiner 906 and the decimator 904. The output signal of the decimator is provided to the input of the LPF 902. The output of the LPF 902 is combined with the input signal at the combiner 906. The LPF 902 has an enable input for controlling operation of the filter 900.

The LPF 902 in the baseline tracking filter 900 is used to improve the estimate of the baseline capacitance value. One embodiment uses a simple finite impulse response (FIR) moving average filter of length N (aka "comb filter"), such as:

$$H_N(z) = \frac{1}{N} \cdot \frac{1 - z^{-N}}{1 - z^{-1}} = \frac{1}{N} \cdot \sum_{n=0}^{N-1} z^{-n}$$

Another embodiment a 1-tap infinite impulse response (IIR) filter, also referred to as a modified moving average, with response:

$$H_k(z) = \frac{\frac{1}{k}}{1 - \left(1 - \frac{1}{k}\right) z^{-1}}$$

The FIR embodiment of the filter 902 may be used upon startup and recalibration of the baseline value, as it can quickly acquire and track the baseline value. The IIR embodiment of the filter 902 should be used once the baseline value is acquired, as it can be a very computationally efficient means to implement a low-pass filter, particularly if k is chosen to be a power of 2. By increasing the value of k, one can set change the signal bandwidth of the filter to arbitrarily small values with minimal increase in computational complexity.

Filter 900 has two outputs, labeled "Out" and "Baseline" in FIG. 9. The Baseline output is the estimate of the current baseline (aka ambient or untouched) capacitance of the particular panel pixel(s) being scanned, and the Out output is the baseline-corrected value of that capacitance measurement. The Out value is what should be used in the subsequent touch-detection logic.

The LPF 902 in FIG. 9 has an enable signal in order to shut down the LPF 902 when a touch event is detected. This is provided so that the baseline output is not corrupted by spurious data, most likely from a touch event. If the enable signal is low, the LPF 902 will hold its previous output without updating its output with the incoming data, effectively ignoring the incoming data. Once the enable signal is high, the LPF 902 will continue to update its output with the incoming data. Logic for generating the enable signal is detailed in the following equation:

$$\text{Enable} = (\text{Out} \le \text{PosLPFThresh}) \&\& (\text{Out} \ge \text{NegLPFThresh})$$

where PosLPFThresh and NegLPFThresh are configurable parameters.

In a mutual-capacitance scan mode, where a touch event causes a reduction in the input data, the NegLPFThresh should be set to $k_T$*TouchThresh, where $0<k_T<1$ and TouchThresh is the touch-detection threshold defined below. These may both be programmable parameters. In a mutual-capacitance scan mode, there is no expected physical mechanism that would cause the input data to exhibit a positive transient. Therefore, PosLPFThresh may be a programmable parameter used to filter out spurious data, should an unexpected positive transient occur.

Programmable Update Rate

The timescale of most baseline drift phenomena will be far slower than the frame rate of the touch panel scan. For instance, observed baseline drift devices had timescales on the order of 1 hour or longer, whereas the frame rate of a current device may be on the order of 200 frames/second. Therefore, in order to reduce the computation for baseline tracking, the controller circuit 104 shall have the capability to scale the update rate of the baseline tracking filter 900. The device may do this by using the decimator 904 to decimate the data fed to the filter 900, so that the filter 900 only operates on every N_BTF_decimate frames of heatmap data, where N_BTF_decimate is a programmable parameter. Therefore, the Baseline signal in FIG. 9 will update at this slower rate. However, the baseline corrected output signal ("Out" in FIG. 9) may be calculated for every frame.

Baseline tracking needs to exercise special care when spectrum estimation mode (SEM) is invoked. SEM may cause a configuration change in the analog front end which in turn will alter the gain in the transfer function (e.g. from capacitance values to codes) of the touch front end. This, in turn, may cause abrupt changes in the capacitive heatmap to occur that could be accidentally interpreted as touch events.

A touch event is detected when the baseline-corrected output exhibits a significant negative shift. The shift in this output may be larger than a programmable parameter, called TouchThresh. Furthermore, since the controller circuit 104 may scan a panel at upwards of 200 Hz and a human finger or metal stylus moves at a much slower timescale, a programmable amount of debounce, dubbed TouchDebounce, should also be included. Therefore, before a touch is recognized, the output of the baseline filter may be more negative than TouchThresh for at least TouchDebounce frames. It is likely that TouchDebounce will be a small value, in order that the total touch response time is faster than 10 ms.

Heatmap Noise Estimation

Figure 10:
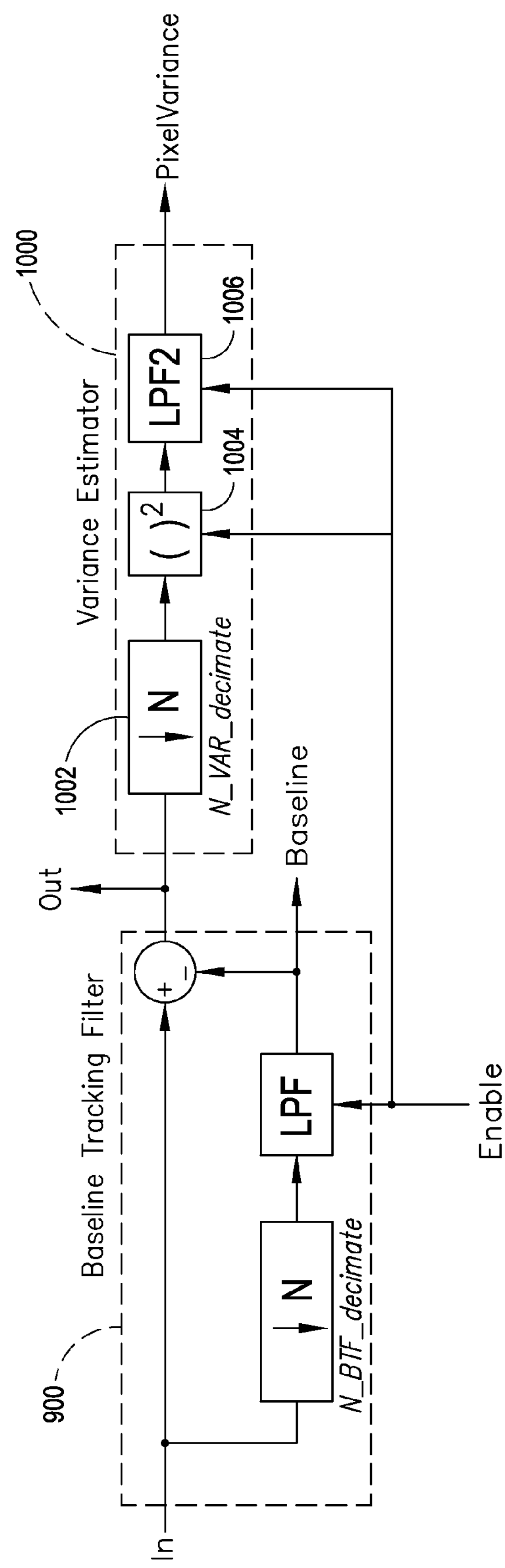
FIG. 10 shows an exemplary first variance estimator in conjunction with the baseline tracking filter of FIG. 9.

The touch back end 134 requires an estimate of the noise level in the capacitive touch panel 102 in order to properly threshold the touch blobs during the detection process. The noise level can be detected by observing noise at the output of the baseline tracking filter as shown in FIG. 10. FIG. 10 shows a first variance estimator 1000 in conjunction with the baseline tracking filter 900 of FIG. 9. In FIG. 10, the baseline tracking filter 900 has its Out output coupled to an input of the variance estimator 1000. The variance estimator 1000 includes a decimator 1002, a signal squarer 1004 and a low-pass filter 1006. The variance estimator 1000 in this embodiment is simply a mean-square estimator, as the output of the baseline tracking filter 900 is zero-mean. Hence the mean-square is equal to the variance.

In order to lower the computational requirements for the variance estimator 900, the data entering the variance estimator can be decimated in the decimator 1002 by the factor, N_VAR_decimate. The low-pass filter 1006 in the variance estimator 1000 may either be a comb-filter or a modified-moving-average filter. The length of the response of the filter 1006 may be a programmable parameter, averaging data over as many as 100 or more frames. In order to lower memory requirements, the MMA filter may be preferred.

As with the baseline tracking filter 900, the LPF 1006 in the variance estimator 1000 has an input for an enable signal. The enable signal is low when the pixel in question is being touched. Otherwise, the variance estimate will be corrupted by the touch signal. When the enable signal is low, the LPF 1006 should retain state, effectively ignoring the data coming into the variance estimator 1000.

The output of the variance estimator 1000 is the variance of one single pixel in the capacitive touch panel 102. Therefore, this provides an independent variance estimate of each pixel in the panel. To get an estimate of the variance across the panel 102, the controller circuit 104 may average the per-pixel variances across the entire frame.

Figure 11:
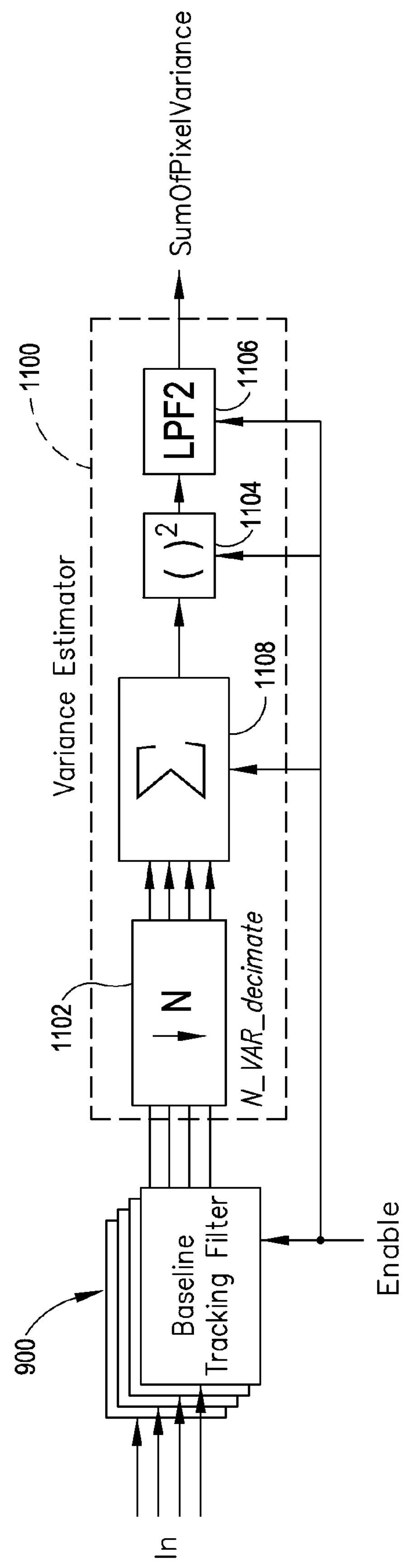
FIG. 11 shows an exemplary second variance estimator in conjunction with the baseline tracking filter of FIG. 9.

Alternately, if only a single per-frame variance estimate is needed, the controller circuit 104 can follow the approach shown in FIG. 10. FIG. 11 shows a second variance estimator 1100 in conjunction with the baseline tracking filter 900 of FIG. 9. In FIG. 11, all the per-pixel baseline tracking filters are grouped as baseline tracking filters 900, on the left in the figure. All the baseline-corrected outputs from the baseline tracking filters 900 are passed to the variance estimator 1100.

Like the variance estimator 1000 of FIG. 10, the variance estimator 1100 includes a decimator 1102, a signal squarer 1104 and a low-pass filter 1106. The variance estimator 1100 further includes a summer 1108. The variance estimator 1100 combines the outputs of the baseline tracking filters 900 into a single value by summing the baseline-corrected outputs across the entire frame in the summer 1108. This averaged value is then passed to the same square-and-filter estimator that was described above, formed by the signal squarer 1104 and the low-pass filter 1106. Assuming that the noise is uncorrelated from pixel-to-pixel, the output of the variance estimator 1100 is equal to the sum of all the pixel variances reported by the block diagram in FIG. 10. In order to generate the average pixel variance across the panel, this result may be divided by the total number of pixels in the capacitive touch panel 102. To generate an estimate of the standard-deviation of the noise, the controller circuitry 104 may take the square root of the variance.

Adaptive Reconfiguration

As described above, a high signal to noise ratio (SNR) of the signal received at the controller circuit 104 from the touch panel display is desirable. In capacitive-touchscreen devices, many noise/interference sources can couple onto the received channels 704 (FIG. 7). Interferers may be due to noise from the LCD 112 (FIG. 1), noise from circuit components such as thermal noise, quantization noise, flicker noise, etc.; noise from radio frequency (RF) circuitry; noise from the device's power source such as battery 114 (FIG. 1); or noise from other unidentified sources that couple onto the received signal. Frequently, these interferers are substantially larger than the desired signal, and have many harmonic tones that are within the operating frequency of the touch controller system. Hence, these interferers can significantly degrade the SNR achieved by the touch controller system unless they are either avoided or suppressed.

Figure 16:
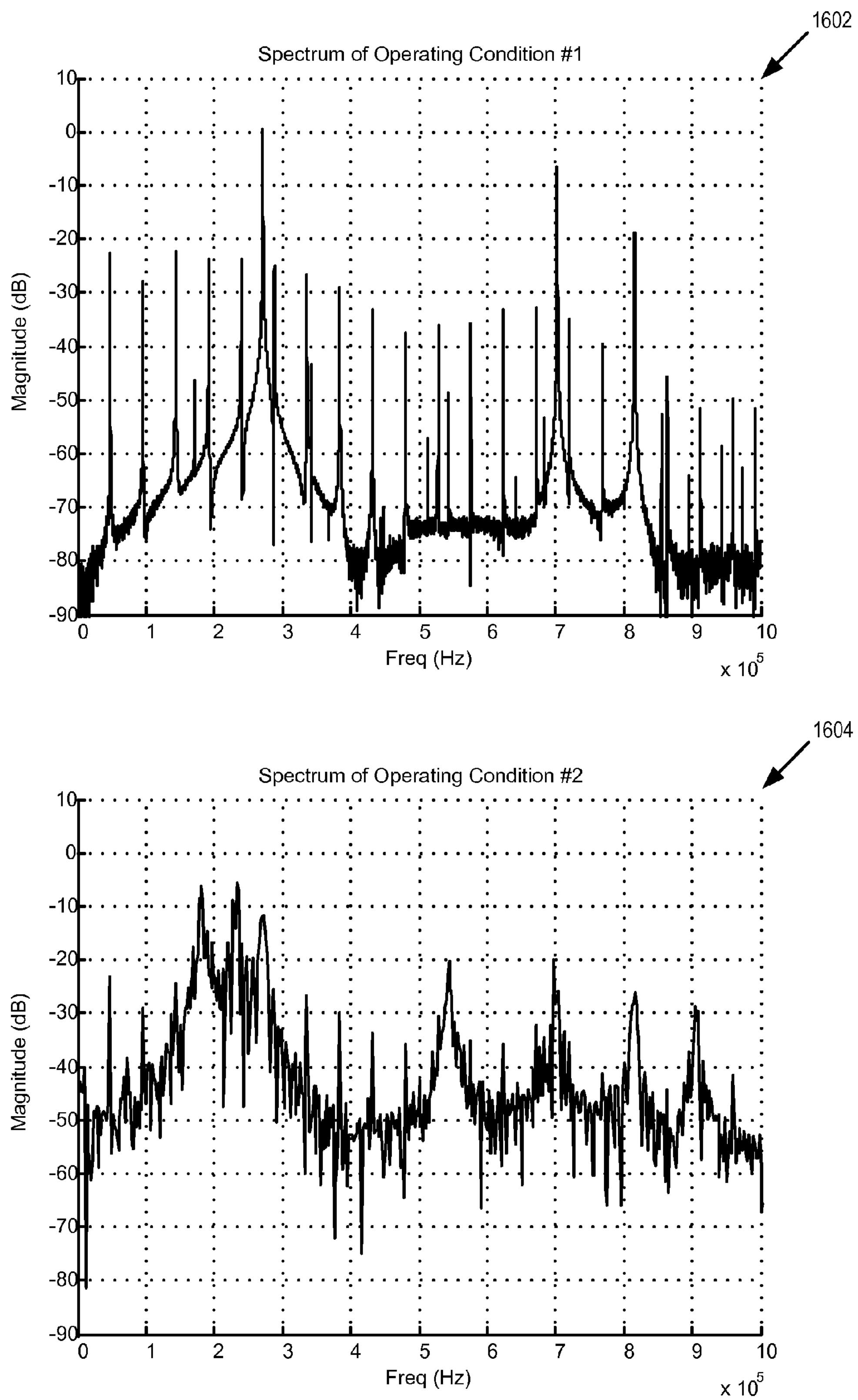
FIG. 16 shows exemplary graphs of the interference profile of the received signal when the touch panel device is operating in two different modes.
Figure 17:
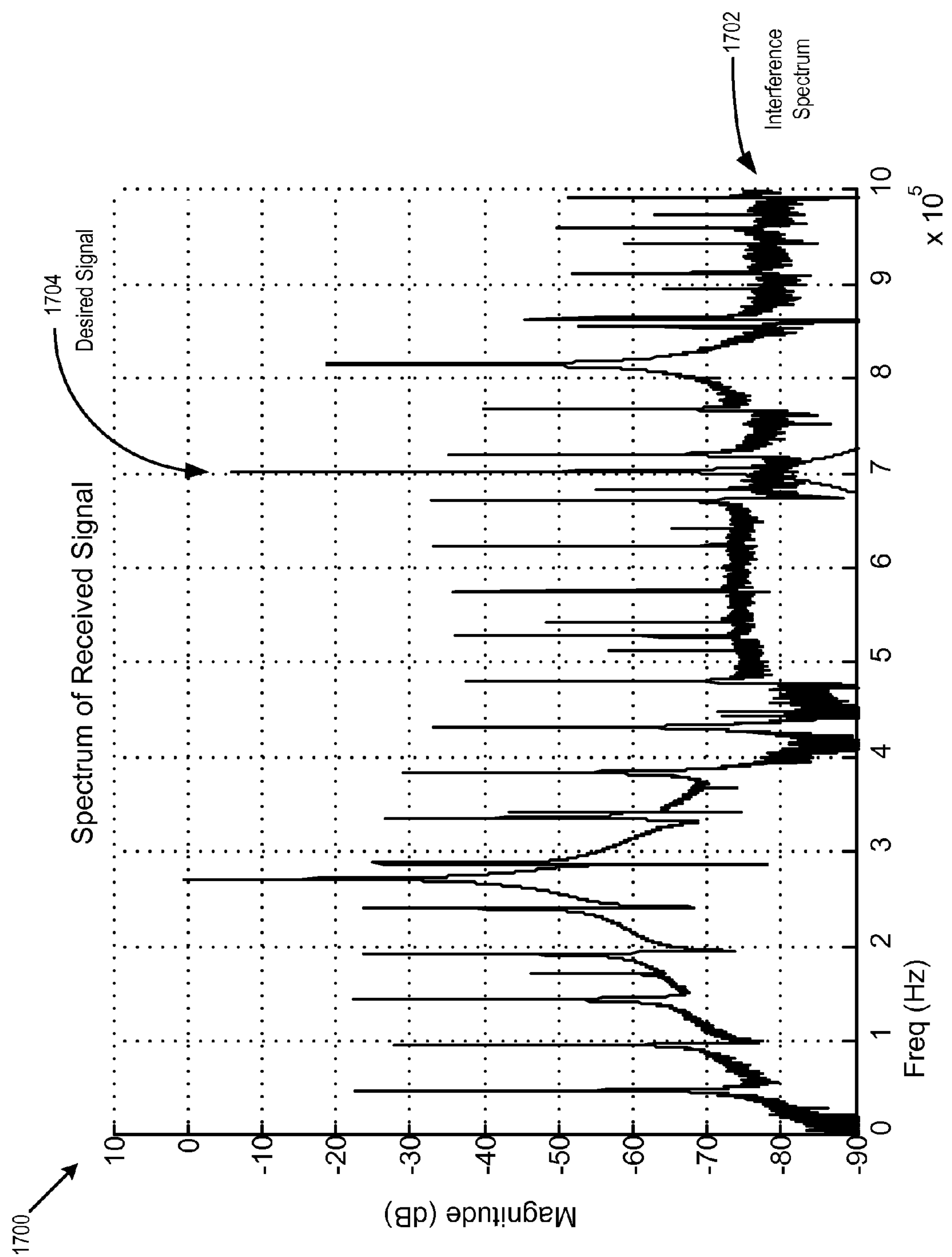
FIG. 17 shows an exemplary graph of the spectral components of the received signal including the interference profile of the received signal and the desired signal.

Interferers may vary in frequency, amplitude, phase, and quantity, depending on the device. Furthermore, these interferers are often dynamic and can change rapidly, based on the operating conditions of the device. For instance, interference while using the device to view a video may be substantially different than using the device to view a webpage. For example, FIG. 16 shows examples of the variability of the interference spectrum. In one mode, the interference spectrum 1602 is coupled onto received channels 704 (FIG. 7). In another mode, the interference spectrum 1604 is coupled onto received channels 704 (FIG. 7). As can be seen in FIG. 16, interference spectrum 1602 is quite different from interference spectrum 1604. FIG. 17 shows the spectrum of the signal received by a received channel 704 (FIG. 7). The high level of interference and noise in the interference spectrum 1702 contributes to a poor signal to noise ratio of the desired signal 1704. Because of the variability of interference and its source, reliable prediction and reduction of interference has heretofore been difficult to attain.

Various methods can be used to improve signal to noise ratio and/or mitigate poor signal to noise ratios. Such methods include increasing the power level of the transmit signal, filtering the received signal, shielding the analog receiver from nearby spurious emissions, reducing circuit noise, and/or performing additional scans. Additionally, the signal to noise ratio of a signal received by an analog receiver can be improved by selecting an optimal transmit frequency and/or by optimally filtering the received signal.

Given the variability of interferers, however, a fixed frequency or a fixed filter may not provide an adequate signal to noise ratio with changing conditions. It would be advantageous to adaptively reconfigure the transmit frequency and/or adaptively reconfigure the filtering of the received channels. By adaptively reconfiguring the transmit frequency and/or adaptively reconfiguring the received signal filtering, a higher signal to noise ratio can be achieved efficiently and dynamically for the variety of interferers that may couple to the received channels.

Figure 12:
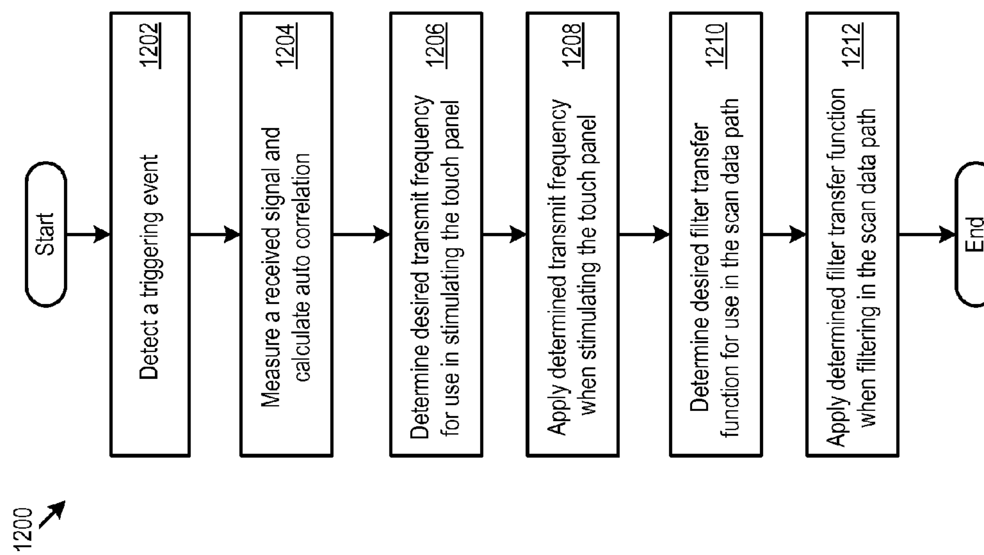
FIG. 12 shows an exemplary flow-chart for the adaptive reconfiguration of a capacitive touch controller.

Referring to FIG. 12, it shows an adaptive reconfiguration process 1200. As contemplated in one implementation, the adaptive reconfiguration process begins at block 1202 where a triggering event is detected. A triggering event can be used to initiate a process for adaptively reconfiguring the transmit frequency in the AFE and/or adaptively reconfiguring the filtering of the received signal. The triggering event can be timer-based or based on monitoring of the signal to noise ratio. For example, for a timer-based triggering, a processor, such as the scan controller 426 (FIG. 4) could be programmed to detect a triggering event once every second. For a signal to noise ratio trigger, a processor such as the scan controller 426 (FIG. 4) could be programmed to detect a triggering event when the SNR drops below a threshold level of 40 dB.

Once a triggering event has been detected, the adaptive reconfiguration process 1200 continues to block 1204 where the touch system switches into spectrum estimation mode. As described above, this mode is used to measure the interference and noise spectrum that couples into each physical receive channel 704 (FIG. 7). This spectrum estimation mode allows the touch system to measure and calculate the received signal across a wide frequency band. In this mode, the scan controller 426 (FIG. 4) instructs all TX channels 702 (FIG. 7)

to stop transmitting and configures receive channels 704 (FIG. 7) for a wideband measurement. Without transmitting, the touch system is able to measure the interferers and noise across the entire relevant available frequency band. For example, in some cases, the relevant available frequency band of the physical receive channel 704 (FIG. 7) may be between 0 MHz and 1 MHz, but other frequency bands may be used, depending on the specific parameters of physical receive channel 704 circuitry. The scan controller 426 (FIG. 4) can be used to set the touch system to spectrum estimation mode.

While the touch system is operating in spectrum estimation mode, the spectrum estimation preprocessor 432 (FIG. 4) determines the auto-correlation of the received signal to measure its spectral components. Because this received signal is captured while operating in spectrum estimation mode, the spectral components of the received signal will include only interferers and other noise. Thus, from the spectrum estimation mode measured signal, the spectrum estimation preprocessor 432 can calculate the auto-correlation function of the interferers and other noise.

Using the auto-correlation of the interferers and other noise determined in block 1204 of the adaptive reconfiguration process 1200, the process continues to block 1206 where a processor, such as processor 122 (FIG. 1) or a processor in the TBE 134 (FIG. 1) uses the auto-correlation function of the interferers and noise to determine a desired transmit frequency to be used for the transmit channels 402 (FIG. 4) of the analog front end 400 (FIG. 4). After the desired transmit frequency is determined, the adaptive configuration process 1200 continues to block 1208, where the determined transmit frequency is applied to the transmit channels 402 (FIG. 4) of the AFE 400 (FIG. 4).

In order to determine an optimal transmit frequency, the spectrum estimation preprocessor 432 (FIG. 4) can calculate the mean square error (MSE) of the filter transfer function associated with each available transmit frequency. An optimal transmit frequency ($f_{opt}$), then, is the transmit frequency that corresponds to the minimum MSE. For example, when available transmit frequencies range from 100 kHz to 800 kHz in steps of 10 kHz, there are seventy-one frequencies for which an MSE of the filter transfer function can be calculated. Those of ordinary skill in the art will recognize that other frequency ranges and frequency steps can also be used. The transmit frequency for which the MSE calculation results in the smallest MSE is an optimal transmit frequency. For example, assuming the auto-correlation of the interferer is $r_v(n)$, and assuming the interferer is filtered using a filter of impulse response $h_2(n)$, the output auto-correlation will be $r_y(n)=r_v(n)*h_2(n)*h_2(-n)$, where '*' denotes convolution and the output power is given by $r_y(0)$. The filter of impulse response $h_2(n)$ is assumed to be centered at a given frequency $\omega_0$. In one implementation, $h_2$ could be an FIR filter of length $L_2$ of the form $h_2(n)=\sin(\omega_0 n+\theta)$, $n=0, \ldots, L_2-1$, for some $\theta$. The spectrum estimation processor 432 can tune $h_2$ to different frequencies and compute $r_y(0)$ for each frequency. In such a manner, the spectrum estimation process 432 can determine the frequency that yields the lowest noise power, and therefore minimizes the MSE.

By way of example, presume the received signal is $r(n)=A\sin(\omega_0 n+\theta)+v(n)$ where $n=0, \ldots, L-1$ and L is the length of the observation window; A is the unknown amplitude we wish to determine; $\omega_0$ is the transmit frequency used by the TX 402; $\theta$ is the phase of the received signal; and $v(n)$ is the interference plus noise (assumed to be random). In vector notation, the received signal can be written $r=As_\theta+v$. Assuming the interferer is zero-mean and represented by the covariance matrix $R_v$, the best linear unbiased estimator of A given $s_\theta$ is given by the filter $$h=\frac{R_v^{-1}s_\theta}{s_\theta^* R_v^{-1}s_\theta}$$

and the resulting minimum MSE can be written $MSE=h^*R_v h=1/(s^*_\theta R_v^{-1}s_\theta)$. An optimal transmit frequency minimizes the MSE, or equivalently maximizes $s^*_\theta R_v^{-1}s_\theta$. Once an optimal transmit frequency is found, an optimal filter can be calculated to reject interferers and reduce noise.

To summarize an implementation of blocks 1202, 1204, 1206, and 1208 of the adaptive reconfiguration process 1200 (FIG. 12) by referring to FIG. 4, a triggering event occurs and the scan controller 426 is notified by a processor such as processor 122 (FIG. 1) that the frequency used by the transmit channels 402 and/or to the filtering in the scan data path 408 should be updated. To determine the transmit frequency, the scan controller 426 sets the received channels 406 to spectrum estimation mode, and operates as described above. The spectrum estimation preprocessor 432 determines the auto-correlation waveform data and provides this data to a processor such as processor 122 (FIG. 1). The processor 122 (FIG. 1) calculates the MSE for each available frequency. Then, the frequency that corresponds to the minimum MSE is determined, which is an optimal frequency ($f_{opt}$) for use by the transmit channels 402. This optimal frequency is reported to the scan controller 426 and the transmit frequency parameter of the waveform generation block (WGB) 404 is configured to use this optimal frequency ($f_{opt}$). In addition, the receive frequency of the AFE is configured to use this optimal frequency.

The adaptive reconfiguration process 1200 continues to block 1208 where a processor such as processor 122 (FIG. 1) determines the adaptive filter transfer function for use in the scan data path 408 (FIG. 4). A processor such as processor 122 (FIG. 1) calculates an optimal filter transfer function and corresponding filter coefficients based on the correlation data provided from the spectrum estimation preprocessor 423 (FIG. 4) that was measured and calculated in block 1204. These filter coefficients will be used by the interferer filter contained in scan data path 408 (FIG. 4). After the desired filer coefficients are determined, the adaptive configuration process 1200 continues to block 1212, where the determined transfer function is applied to the interferer filter contained in the scan data path 408 (FIG. 4).

Determining the MSE of the filter transfer function for each frequency may require significant processing. While many methods may be used to reduce the amount of processing required to calculate the MSE of the filter transfer function, such as reducing the available frequency range or increasing the step frequency, one method is to form a filter transfer function by cascading a fixed, but tunable, filter with an adaptive filter. In this manner, the amount of processing is reduced because the fixed filter will have a known filter transfer function which simplifies the calculations for the adaptive filter transfer function.

Figure 13:
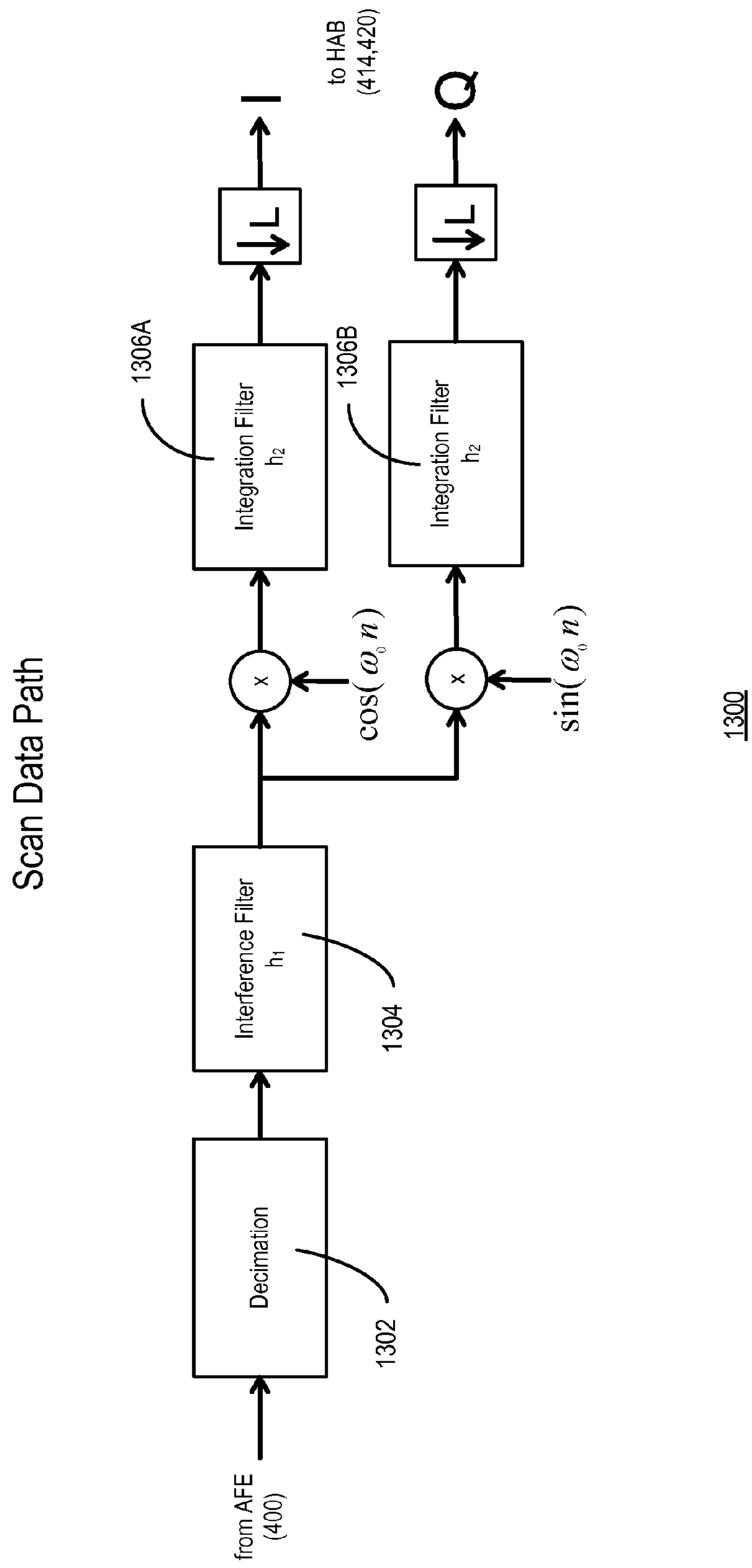
FIG. 13 shows an exemplary differential scan data path with decimation, interference, and integration filters, using an in-phase (I) path and a quadrature (Q) path.

Referring to FIG. 13, an example of a scan data path 1300 is shown which receives data from the AFE 400 (FIG. 4) and transmits data to the I/Q channels of HAB 414, 420 via in-phase (I) and quadrature (Q) outputs. Those of ordinary skill in the art will recognize that a single-ended scan data path may also be used. The scan data path 1300 shows that filtering occurs in interference filter 1304 and integration filters 1306A and 1306B. In one implementation, the filter transfer function h for the scan data path is comprised of two cascaded filters, $h_1$ and $h_2$. Interference filter 1304 ($h_1$) is tuned to reduce variable interferers while integration filters 1306A-B ($h_2$) are tuned for overall noise reduction.

The filter transfer function h can be written $h=H_2h_1$, where the adaptive filter is $h_1$ and $H_2$ is a fixed convolution matrix based on filter $h_2$. Thus, $$h_1 = \frac{(H_2^* R_v H_2)^{-1} H_2^* s}{s^* H_2 (H_2^* R_v H_2)^{-1} H_2^* s}, \text{ and}$$

$$MSE = \frac{1}{s^* H_2 (H_2^* R_v H_2)^{-1} H_2^* s}.$$

If differential in-phase (I) and quadrature (Q) demodulation is used, then $h_1=H_{2I}h_1$ and $h_Q=H_{2Q}h_1$.

To compute $h_1$, we then use $h_1=\alpha(H^*_2R_vH_2)^{-1}H^*_2s$, where $\alpha$ is a normalization constant and the matrix $H^*_2R_vH_2$ is a Toeplitz matrix and s is a sinusoid of the transmit frequency $f_{stim}$. Thus, $h_1$ can be efficiently computed using a Durbin algorithm.

FIGS. 14A-C show various implementations of cascaded filter transfer functions $h_1$ and $h_2$ in a single-ended scan data path. Those of ordinary skill in the art will recognize that a differential in-phase (I) and quadrature (Q) scan data path may be used. FIG. 14A shows a simple scan data path with a decimation block 1402, interference filter 1404 ($h_1$), and integration filter 1406 ($h_2$). The interference filter 1404 ($h_1$) can be, for example, a multi-tap digital filter having variable filter coefficients that can be tuned to reduce various types of interference. FIG. 14B shows a similar scan data path, but integration filter 1406 ($h_2$) is comprised of an integration filter 1406A ($h_{2-1}$) cascaded with an integration filter 1406B ($h_{2-2}$). FIG. 14C shows that the filters can be cascaded in various orders.

Figure 15:
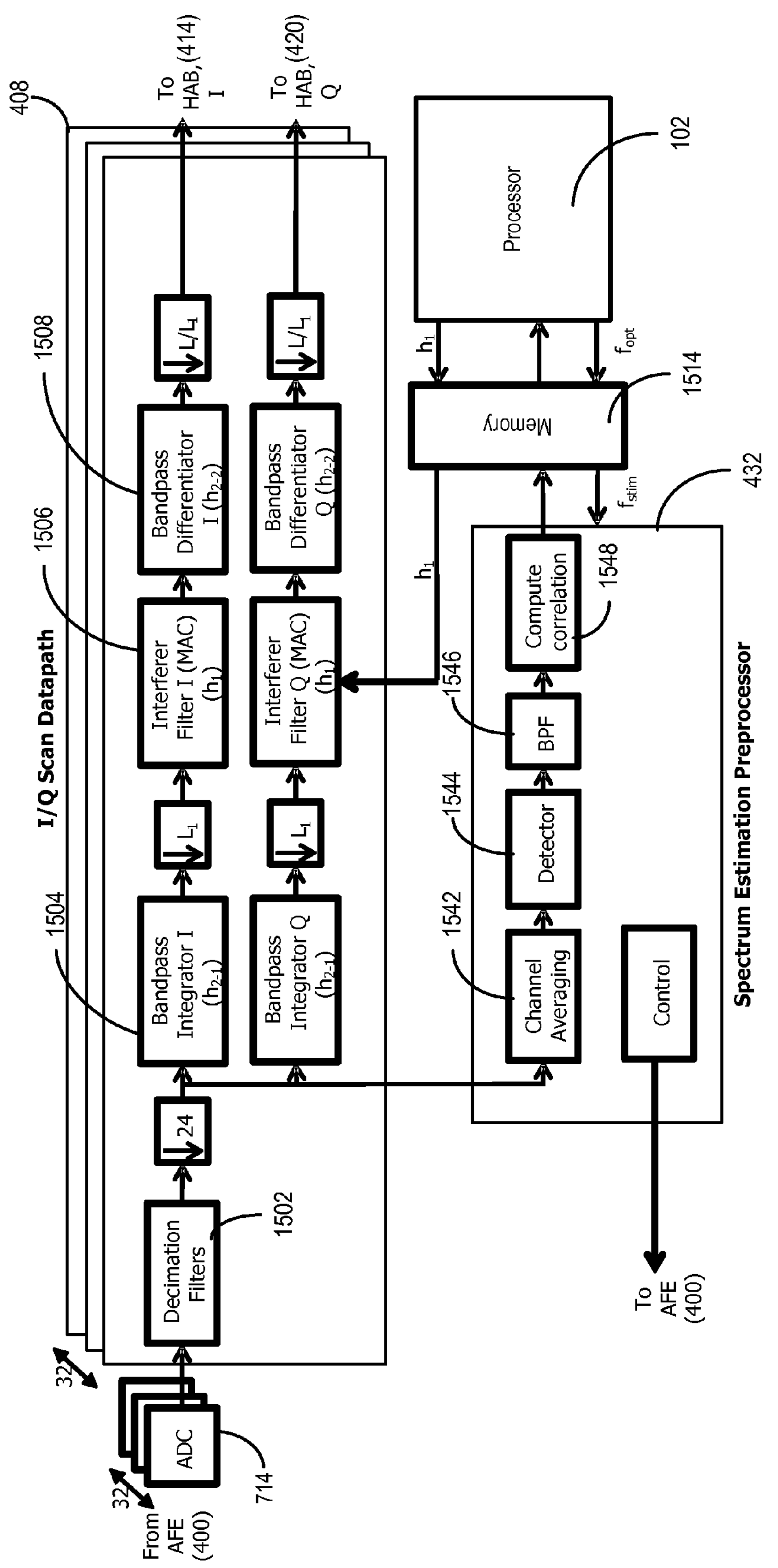
FIG. 15 shows a diagram of the details of exemplary portions of the adaptive reconfiguration, where the scan data path block includes decimation filters, integration filters (bandpass integrators), differentiation filters (bandpass differentiator), interferer filters, and differential in-phase (I) and quadrature (Q) outputs.

FIG. 15 shows an implementation of the scan data path 432 as it interacts with the spectrum estimation preprocessor 408 and the processor 102. The scan data path 432 contains decimation filter 1502, which can be implemented by a multi-tap symmetric filter for removing out of band noise and reducing the sampling rate. Bandpass filtering is performed in two stages by an integration filter 1504 and differentiation filter 1508. In between the two-staged bandpass filter is interference filter 1506, which has a configurable filter transfer function ($h_1$). After filtering is performed in scan data path 1510, the differential in-phase (I) and quadrature (Q) signals are fed to the I/Q channels of the HAB 414, 420 (FIG. 4).

In order to configure the filter transfer function ($h_1$) for the adjustable interference filter 1506, the spectrum estimation preprocessor 408 is used. The spectrum estimation preprocessor 408 receives the output of the decimation filter 1502 and determines the auto-correlation of the received signal. The channel averaging block 1542 selects either the received signal interference/noise of an individual physical receive channel or averages the received signal interference/noise across all physical receive channels. Next, the detector block 1544 uses a threshold value to detect the presence of an interferer that may require filtering by the adjustable interference filter 1506. The bandpass filter block (BPF) 1546 applies the estimated bandpass filter transfer function that results from cascading bandpass integration filter 1504 with bandpass differentiation filter 1508 in the scan data path. BFP block 1546 can be bypassed to compute the wideband auto-correlation. The auto-correlation of the interferer is calculated in the compute correlation block 1548 of the spectrum estimation preprocessor 408. The processor 102 receives this interferer spectrum information from the spectrum estimation bock 408, which can be via a buffered memory 1514. The processor 102 calculates an optimal filter transfer function as described above, and then calculates an optimal filter transfer function for use by the interference filters 1506, which can be via a buffered memory 1514.

Figure 18:
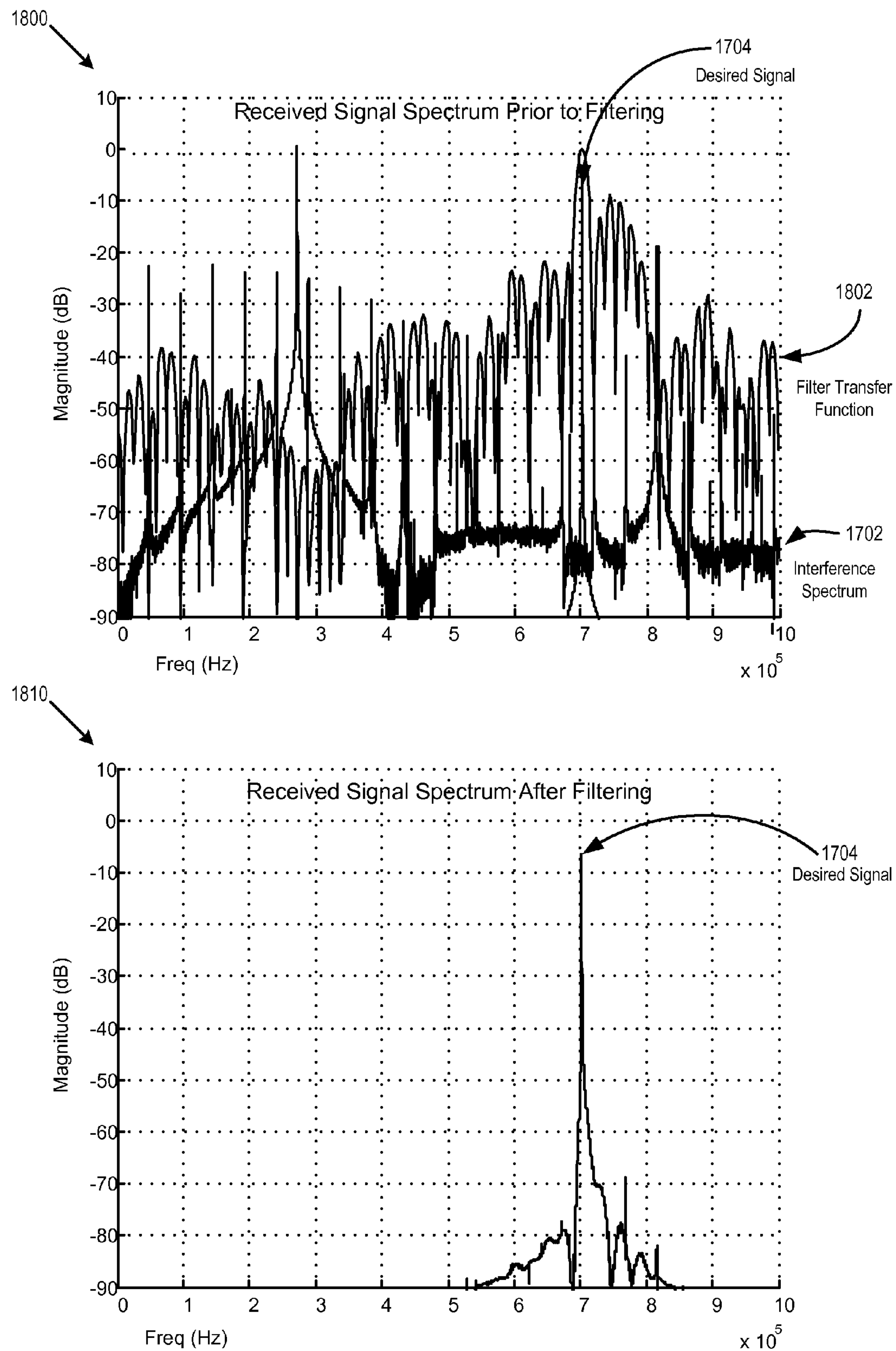
FIG. 18 shows exemplary graphs of the spectral components of the received signal before and after filtering with a filter transfer function.

Referring to FIG. 18, it shows a received signal spectrum 1800, which includes the desired signal 1704, the interference spectrum 1702 and the frequency response of the adaptive filter 1802. After applying the filter transfer function to the received signal spectrum 1800, the filtered received signal spectrum 1810 results. The interferers and noise from the interference spectrum 1702 are now reduced, and the signal to noise ratio of the desired signal 1704 is improved.

The methods, devices, and logic described above seek to efficiently and reliably provide a high signal to noise ratio for measuring the capacitance of the touch panel. By adaptively determining the frequency of the signal transmitted to the touch panel and then filtering the received signal using an adaptive filter, the touch device becomes robust to dynamic interference variations, and improves the touch performance of the touch panel device.

The methods, devices, and logic described above may be implemented in many different ways in many different combinations of hardware, software, or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What claimed is:

1. A method for reconfiguring a capacitive touch controller, the method comprising:

detecting a triggering event for reconfiguring the capacitive touch controller;

measuring a received signal from a capacitive touch panel;

determining an auto-correlation of the received signal;

determining a filter transfer function for rejecting interference from a subsequently received signal, where the filter transfer function is based on the auto-correlation of the received signal;

determining a transmit frequency for stimulating the capacitive touch panel, where the transmit frequency is based on the auto-correlation of the received signal, including determining an optimal transmit frequency from a range of available frequencies, where each available frequency has a mean square error (MSE), where the MSE is determined by the inner product of the auto-correlation of the received signal and auto-correlation of the filter transfer function, and where the optimal transmit frequency is the available frequency having the minimum MSE;

stimulating the capacitive touch panel using the transmit frequency by applying to the capacitive touch panel a time varying signal having the transmit frequency, and subsequently receiving a signal from the capacitive touch panel, the subsequently received signal being indicative of a response of the capacitive touch panel to the time varying signal; and filtering a subsequently received signal using the filter transfer function.

2. The method of claim 1, where the triggering event occurs when signal to noise ratio (SNR) of the received signal is below a threshold SNR value.

3. The method of claim 1, where the triggering event occurs when a period of time has elapsed.

4. The method of claim1, where determining the filter transfer function comprises determining a bandpass filter transfer function in series with a finite impulse response filter transfer function, wherein the filter transfer function is calculated to improve signal to noise ratio (SNR) of the subsequently received signal.

5. The method of claim 4, where determining the filter transfer function for the finite impulse response filter comprises determining filter coefficients for a multi-tap digital filter.

6. The method of claim 1, wherein determining the transmit frequency for stimulating the capacitive touch panel comprises determining the best linear unbiased estimator from the auto-correlation of the received signal.

7. A capacitive touch controller comprising:

a detector configured to detect a triggering event for reconfiguring the capacitive touch controller;

a signal processor configured to measure a received signal from a capacitive touch panel of the capacitive touch controller and determine auto-correlation of the received signal;

a filter processor configured to determine a filter transfer function for rejecting interference from a subsequently received signal, where the filter transfer function is based on the auto-correlation of the received signal;

a frequency processor configured to determine a transmit frequency for stimulating the capacitive touch panel, where the transmit frequency is an optimal transmit frequency selected from a range of available frequencies, where each available frequency has a mean square error (MSE), where the MSE is determined by the inner product of the auto-correlation of the received signal and the auto-correlation of the filter transfer function, and where the optimal transmit frequency is the available frequency having the minimum MSE;

a transmitter configured to stimulate the capacitive touch panel using the transmit frequency; and a filter configured to apply the filter transfer function to a subsequently received signal.

8. The controller of claim 7, where the triggering event occurs when signal to noise ratio (SNR) of the received signal is below a threshold SNR value.

9. The controller of claim 7, where the triggering event occurs when a period of time has elapsed.

10. The controller of claim 7, where the filter transfer function comprises a bandpass filter transfer function in series with a finite impulse response filter transfer function, wherein the filter transfer function is calculated to improve signal to noise ratio (SNR) of the subsequently received signal.

11. The controller of claim 10, where the filter transfer function for the finite impulse response filter comprises a multi-tap digital filter.

12. The controller of claim7, wherein the filter processor comprises a circuit configured to determine the filter transfer by determining the best linear unbiased estimator from the auto-correlation of the received signal.

13. A portable data processing device comprising:

a video display;

a capacitive touch panel;

a control circuit operative to provide signals to the video display to produce images on the video display and operative to detect touch interactions with the capacitive touch panel, the control circuit including a capacitive touch controller comprising:

a detector configured to detect a triggering event for reconfiguring the capacitive touch controller;

a signal processor configured to measure a received signal from the capacitive touch panel of the portable data processing device and determine auto-correlation of the received signal;

a filter processor configured to determine a filter transfer function for rejecting interference from a subsequently received signal, where the filter transfer function is based on the auto-correlation of the received signal;

a frequency processor configured to determine a transmit frequency for stimulating the capacitive touch panel with a stimulation signal applied to the capacitive touch panel, where the transmit frequency is an optimal transmit frequency selected from a range of available frequencies, where each available frequency has a mean square error (MSE), where the MSE is determined by the inner product of the auto-correlation of the received signal and auto-correlation of the filter transfer function, and where the optimal transmit frequency is the available frequency having the minimum MSE;

a transmitter configured to stimulate the capacitive touch panel using the transmit frequency; and a filter configured to apply the filter transfer function to a subsequently received signal.

14. The portable data processing device of claim 13, where the triggering event occurs when signal to noise ratio (SNR) of the received signal is below a threshold SNR value or when a period of time has elapsed.

15. The portable data processing device of claim 13, where the filter transfer function comprises a bandpass filter function in series with a finite impulse response filter function, wherein the filter transfer function is calculated to improve signal to noise ratio (SNR) of the subsequently received signal by filtering noise coupled to the received signal by the video display, the capacitive touch panel, and/or the touch controller.

16. The portable data processing device of claim 15, where the filter transfer function for the finite impulse response filter comprises a multi-tap digital filter.

17. The portable data processing device of claim 13, wherein the signal processor comprises a circuit configured to determine the auto-correlation of the received signal by determining the best linear unbiased estimator from the auto-correlation of the received signal.

* * * * *